(12) United States Patent
Welsh et al.

(10) Patent No.: US 11,347,478 B2
(45) Date of Patent: May 31, 2022

(54) ANALOG ARITHMETIC UNIT

(71) Applicant: Octavo Systems LLC, Sugar Land, TX (US)

(72) Inventors: Erik James Welsh, Bellaire, TX (US); Laurence Ray Simar, Jr., Richmond, TX (US); Peter Linder, Sugar Land, TX (US); Gene Alan Frantz, Sugar Land, TX (US)

(73) Assignee: OCTAVO SYSTEMS LLC, Sugar Land, TX (US)

( * ) Notice: Subject to any disclaimer, the term of this patent is extended or adjusted under 35 U.S.C. 154(b) by 0 days.

(21) Appl. No.: 16/975,013

(22) PCT Filed: Feb. 22, 2019

(86) PCT No.: PCT/US2019/019221
§ 371 (c)(1),
(2) Date: Aug. 21, 2020

(87) PCT Pub. No.: WO2019/165257
PCT Pub. Date: Aug. 29, 2019

(65) Prior Publication Data
US 2021/0072958 A1  Mar. 11, 2021

Related U.S. Application Data

(60) Provisional application No. 62/634,681, filed on Feb. 23, 2018.

(51) Int. Cl.
*G06F 7/57* (2006.01)
*G06F 7/485* (2006.01)
*G06F 7/499* (2006.01)
*G06J 1/00* (2006.01)

(52) U.S. Cl.
CPC ............... *G06F 7/57* (2013.01); *G06F 7/485* (2013.01); *G06F 7/4991* (2013.01); *G06J 1/00* (2013.01)

(58) Field of Classification Search
CPC .. G06J 1/00; G06F 7/5443; G06F 7/57; G06F 7/50; G06F 7/523; G06F 17/15; H03H 17/00; H03H 17/06; H03H 2017/0081
See application file for complete search history.

(56) References Cited

U.S. PATENT DOCUMENTS 3,171,022 A * 2/1965 Schmid ............... G06J 1/00
708/7
4,499,549 A * 2/1985 Bartlett ............... G06J 1/00
708/2

(Continued)

OTHER PUBLICATIONS

International Search Report and Written Opinion issued in Application No. PCT/US2019/019221, dated May 14, 2019, 7 pages.

*Primary Examiner* — Matthew D Sandifer
(74) *Attorney, Agent, or Firm* — Rothwell, Figg, Ernst & Manbeck, P.C.

(57) ABSTRACT

The present disclosure describes a mixed signal arithmetic logic unit configured to use a combination of analog processing elements and digital processing elements in a cohesive manner. Depending on the signals and the data received for processing, the analog processing elements and digital processing elements may be used separately, independently or in combination to optimize computational results and the performance of the mixed signal arithmetic logic unit.

18 Claims, 20 Drawing Sheets

(56) References Cited

U.S. PATENT DOCUMENTS 5,210,707 A * 5/1993 Hamamatsu .............. G06J 1/00
                                                                                              341/141
2009/0292520 A1   11/2009  Nwankpa et al.
2016/0182073 A1    6/2016  Speir et al.
2019/0102175 A1 *  4/2019  Roberts ............... G06F 9/30101

* cited by examiner

FIG. 11C

| Sample period | Accumulator 0 | Accumulator 1 | Accumulator 2 | Accumulator 3 | ACC Out | Output results 11230 |
|---|---|---|---|---|---|---|
| P1 | S1a0 | S1a1 | S1a2 | S1a3 | 0 | No output |
| P2 | S2a1 | S2a2 | S2a3 | S2a0 | 3 | No output |
| P3 | S3a2 | S3a3 | S3a0 | S3a1 | 2 | No output |
| P4 | S4a3 | S4a0 | S4a1 | S4a2 | 1 | S1a0+S2a1+S3a2+S4a3 |
| P5 | S5a0 | S5a1 | S5a2 | S5a3 | 0 | S2a0+S3a1+S4a2+S5a3 |
| P6 | S6a1 | S6a2 | S6a3 | S6a0 | 3 | S3a0+S4a1+S5a2+S6a3 |
| P7 | S7a2 | S7a3 | S7a0 | S7a1 | 2 | S4a0+S5a1+S6a2+S7a3 |
| P8 | S8a3 | S8a0 | S8a1 | S8a2 | 1 | S5a0+S6a1+S7a2+S8a3 |
| P9 | S9a0 | S9a1 | S9a2 | S9a3 | 0 | S6a0+S7a1+S8a2+S9a3 |
| P10 | S10a1 | S10a2 | Period | S10a0 | 3 | S7a0+S8a1+S9a2+S10a3 |
| P11 | S11a2 | S11a3 | Period | S11a1 | 2 | S8a0+S9a1+S10a2+S11a3 |
| P12 | S12a3 | S12a0 | ... | S12a2 | 1 | S9a0+S10a1+S11a2+S12a3 |

ANALOG ARITHMETIC UNIT

CROSS REFERENCE TO RELATED APPLICATION(S)

This application is a 35 U.S.C. § 371 National Stage of International Patent Application No. PCT/US2019/019221, filed Feb. 22, 2019, designating the United States and claiming priority to U.S. Provisional Application No. 62/634,681, filed on Feb. 23, 2018. The above identified applications are incorporated by reference.

TECHNICAL FIELD

Aspects of the present disclosure relate to computers using both analog and digital elements that work together.

BACKGROUND

Often, today's world of real time computing is digital. But before the digital computer became the dominant method of computing, the analog computer was the primary way to handle real time signal processing. Analog computing elements have been used to take signals from the real world and process them in order to properly control various machines or fire control computers for guided weapons like artillery or torpedoes.

The invention of the microprocessor in the early 1970s seemed to be the end of the analog computing era. The digital computer overcame multiple issues which plagued analog computing, such as noise, drift, and accuracy.

SUMMARY

According to some embodiments, components for a signal processor are described. The processor may be a mixed signal processor having one or more digital arithmetic logic units (ALUs) and one or more analog ALUs. The ALUs are arranged with one or more operative communication paths interconnected between the ALUs. In certain aspects, these communication paths may comprise one or more exchange registers interconnected with the digital ALU and the analog ALU, where the exchange registers are at least configured for use in converting digital data to analog data and analog data to digital data. For example, the digital ALU and the analog ALU may be configured to process a common set of data using the communication paths.

According to some embodiments, a method for performing mixed signal computations is described. The method may begin with reading a first value from a digital ALU and generating a first converted value by converting the first value from the digital ALU to an analog value using a digital to analog (D/A) converter. The method may also include storing the first converted value in an analog ALU and processing the first converted value using the analog ALU. The method may also include reading a second value from an analog ALU and generating a second converted value by converting the second value from the analog ALU to a digital value using an analog to digital (A/D) converter. The method may also include storing the second converted value in a digital ALU and processing the second converted value using the digital ALU.

According to some embodiments, an analog memory word is provided. Whereas a digital memory word may refer to a group of bits stored in a digital memory, taken either from a digital input or sampled analog signal, as used herein, an analog memory word may comprise an analog signal stored as a value in a node of an analog memory. For instance, in some aspects, a single analog memory cell may differ from a single digital cell storing a digital bit, in that the analog memory cell may store an entire analog memory word (much like a group of bits may represent a digital value). In some embodiments, a number of analog cells, each storing an analog memory word, may be arranged in a memory block or array.

According to some embodiments, a method for performing floating point operations using a mixed signal computer is described. The method may begin with reading at least one floating point value from a digital and analog memory of the mixed signal processor using a digital ALU and an analog ALU of the mixed signal processor. The method may further include processing the floating point values using the digital ALU and analog ALU to create at least one new floating point value based on the processing. In some aspects, the method includes storing the at least one new floating point value in registers associated with the digital and analog ALUs.

Aspects of the present disclosure may take advantage of new opportunities in imaging, Internet of Things ("IoT") and cloud computing, which have stretched the digital computer to its limits. For instance, the present disclosure describes a computer containing a combination of analog and digital components/elements and using both in a cohesive manner. Depending on the signals and data the computer manipulates, the analog processing elements and digital processing elements may be used separately, independently or in combination to optimize the computational results and the performance of the computer. Using mixed signal processing one does not need to choose between digital and analog computing.

Some emerging opportunities and their applications will demand a combination of analog and digital computing elements integrated together. There are things the digital computer does best and there are things the analog computer does best. Aspects of the disclosure provide for components for a mixed signal computer which will allow the system designer to seamlessly move back and forth from analog to digital, and digital to analog depending on the data being processed and the algorithms used for processing the data.

According to some embodiments, a mixed signal arithmetic unit is provided that comprises a mixed signal adder, a mixed signal multiplier, and a controller. In some embodiments, the controller is configured to separately control the mixed signal adder and separately control the mixed signal multiplier, wherein the controller is configured to cause the mixed signal adder to: (1) add a received first and second input value, wherein said first and second input values may be: (i) an analog value and another analog value, (ii) a digital value and an analog value, and (iii) a digital value and another digital value; and (2) provide as an output the added value as an analog value or a digital value, and cause the mixed signal multiplier to: (1) multiply a received third and fourth input value, wherein said third and fourth input values may be: (i) an analog value and another analog value, (ii) a digital value and an analog value, and (iii) a digital value and another digital value; and (2) provide as an output the multiplied value as an analog value or a digital value.

According to some embodiments, a mixed signal arithmetic unit is provided that comprises a mixed signal adder, a mixed signal multiplier, and a controller. In some embodiments, the controller is configured to control the mixed signal adder and the mixed signal multiplier, wherein the controller is configured to cause the mixed signal adder to: (1) add: (i) an analog value with another analog value, (ii)

a digital value with an analog value, and (iii) a digital value with another digital value based on a received first and second input value; and (2) send the added value as an analog value or a digital value, wherein the added value is the added value of the received first and second input value, and cause the mixed signal multiplier to: (1) multiply: (i) an analog value with another analog value, (ii) a digital value with an analog value, and (iii) a digital value with another digital value based on a received third and fourth input value; and (2) send the multiplied value as an analog value or a digital value wherein the multiplied value is the multiplied value of the received third and fourth input value.

According to some embodiments, the mixed signal arithmetic unit further comprises an input sign management unit configured to receive an analog signal and preprocess the analog signal such that the analog signal is converted into a floating point value. According to some embodiments, the mixed signal arithmetic unit further comprises an output sign management unit configured to convert the added value or the multiplied value from a floating point value to an analog signal.

According to some embodiments, the mixed signal adder comprises a first overflow detector configured to determine whether the added value, or summed value of two or more inputs, is within a predetermined range. According to some embodiments, the mixed signal adder further comprises a first input scaler and a first output scaler operatively connected to the first overflow detector and configured to maintain the added value within the predetermined range. In some embodiments, the first overflow detector comprises a first comparator configured to determine whether the added value is lower than a predetermined minimum value, a second comparator configured to determine whether the added value is higher than a predetermined maximum value, and a third comparator configured to determine whether the added value is higher than a predetermined percentage of a predetermined maximum value. In some embodiments, the first output scaler is configured to adjust the resulting added value as a result of the first overflow detector determining that the added value is higher than the predetermined percentage of the predetermined maximum value. In some embodiments, the first input scaler is configured to adjust at least one of the first input value and the second input value as a result of the first overflow detector determining that the added value is higher than the predetermined maximum value.

According to some embodiments, the mixed signal multiplier comprises a second overflow detector configured to determine whether the multiplied value is within a predetermined range. According to some embodiments, the mixed signal multiplier further comprises a second input scaler and a second output scaler operatively connected to the second overflow detector and configured to maintain the multiplied value within the predetermined range. In some embodiments, the controller is further configured to route a mantissa of the third value and a mantissa of the fourth value to the second input scaler, wherein the third value and the fourth value are floating point values. In some embodiments, the second overflow detector comprises a first comparator configured to determine whether the multiplied value is lower than a predetermined minimum value, a second comparator configured to determine whether the multiplied value is higher than a predetermined maximum value, and a third comparator configured to determine whether the multiplied value is higher than a predetermined percentage of the predetermined maximum value. In some embodiments, the second output scaler is configured to adjust the multiplied value as a result of the second overflow detector determining that the multiplied value is higher than the predetermined percentage of the predetermined maximum value. In some embodiments, the second input scaler is configured to adjust at least one of the third input value and the fourth input value as a result of the second overflow detector determining that the multiplied value is higher than the predetermined maximum value. In some embodiments, adjusting the value comprises dividing the input value by two and increasing an exponent of that value by one.

According to some embodiments, the mixed signal multiplier comprises at least one or more transistors, and wherein each of the at least one or more transistors comprises a different width to length ratio. In some embodiments, each of the at least one or more transistors comprises a transistor gate connected to a bit of the third input value wherein the third input value comprises a digital value, a transistor source connected to the fourth input value, and a transistor drain operatively connected to a summing junction. In some embodiments, the mixed signal multiplier comprises the summing junction, wherein the summing junction is operatively connected to each of the least one or more transistors and operatively connected or configured to create an output analog value. In some embodiments, the fourth input value comprises an analog value and the output analog value is the multiplied value of the third input value and the fourth input value. In some embodiments, the fourth input value comprises a constant voltage and the output analog signal is a digital-to-analog converted third signal.

According to some embodiments, the mixed signal arithmetic unit further comprises at least one or more multiplexers, at least one or more analog-to-digital converters (ADCs), and at least one or more digital-to-analog converters (DACs), wherein the controller is further configured to control the at least one or more multiplexers to route at least one or more of: the received first, second, third, and fourth input value, the added value, and the multiplied value, and wherein the controller is further configured to control the at least one or more ADCs and DACs to convert at least one or more of: the received first, second, third, and fourth input value, the added value, and the multiplied value.

According to some embodiments, the mixed signal arithmetic unit further comprises at least one or more digital registers, at least one or more digital memory words, at least one or more analog memory words, and an input configured to receive an analog signal, wherein the controller is further configured to access the at least one or more digital registers, digital memory words or analog memory words or the input to receive the first, second, third or fourth input value.

According to some embodiments, the mixed signal arithmetic unit further comprises an output configured to transmit an analog signal, wherein the controller is further configured to cause the mixed signal adder or the mixed signal multiplier to transmit the added value or the multiplied value to the output or the at least one or more digital registers, digital memory words or analog memory words.

According to some embodiments, a mixed signal adder capable of adding: (i) a first digital value with a second digital value, (ii) a first analog value with a second analog value, and (iii) a third digital value with a third analog value is provided. In some embodiments, the mixed signal adder is configured to receive: (i) the first digital value and the second digital value, (ii) the first analog value and the second analog value or (iii) the third digital value and the third analog value; perform an add function to generate an output value, said output value comprising the sum of: (i) the first digital value and the second digital value, (ii) the first digital value and the first analog value or (iii) the first analog value and the second analog value; and transmit the generated output value, wherein the generated output value may be either an analog output or a digital output.

According to some embodiments, a mixed signal multiplier capable of multiplying: (i) a first digital value with a second digital value, (ii) a first analog value with a second analog value, and (iii) a third digital value with a third analog value is provided. In some embodiments, the mixed signal multiplier is configured to receive: (i) the first digital value and the second digital value, (ii) the first analog value and the second analog value or (iii) the third digital value and the third analog value; multiply to generate an output value, wherein the output value comprises the result of multiplying: (i) the first digital value and the second digital value, (ii) the first analog value and the second analog value or (iii) the third digital value and the third analog value; and transmit the generated output value, wherein the generated output value is an analog output value or a digital output value.

According to some embodiments, a mixed signal arithmetic unit is provided that comprises the mixed signal adder and the mixed signal multiplier. In some embodiments, the mixed signal arithmetic unit may further comprise a controller configured to monitor and control the mixed signal adder and the mixed signal multiplier as a function of the types of input signals for said mixed signal arithmetic unit. In some embodiments, the mixed signal adder may receive the third digital value and the third analog value, wherein the controller is configured to control one or more exchange registers to convert the third digital value to an analog value or convert the third analog value to a digital value before the mixed signal adder adds the third digital value and the third analog value. In some embodiments, the mixed signal multiplier may receive the third digital value and the third analog value, wherein the controller is configured to control one or more exchange registers to convert the third digital value to an analog value or convert the third analog value to a digital value before the mixed signal multiplier multiplies the third digital value and the third analog value.

According to some embodiments, the mixed signal arithmetic unit further comprises at least one or more multiplexers, at least one or more analog-to-digital converters (ADCs), and at least one or more digital-to-analog converters (DACs), wherein the controller is further configured to control the at least one or more multiplexers to route at least one or more of: the first, second or third digital input value, the first, second or third analog input value, and the generated output value, and wherein the controller is further configured to control the at least one or more ADCs and DACs to convert at least one or more of: the first, second or third digital input value, the first, second or third analog input value, and the generated output value.

According to some embodiments, the mixed signal arithmetic unit further comprises at least one or more digital registers, at least one or more digital memory words, at least one or more analog memory words, and an input configured to receive an analog signal, wherein the controller is further configured to access the at least one or more digital registers, digital memory words or analog memory words or the input to receive the first, second or third digital input value or the first, second or third analog input value. In some embodiments, the mixed signal arithmetic unit further comprises an output configured to transmit an analog signal, wherein the controller is further configured to transmit the generated output value to the output or the at least one or more digital registers, digital memory words or analog memory words.

According to some embodiments, the mixed signal arithmetic unit may be configured to operate as a finite impulse response (FIR) filter.

According to some embodiments, a method for performing floating point operations using a mixed signal arithmetic unit is provided. The method comprises accessing at least one floating point value from a digital memory word and an analog memory word or a memory location of the mixed signal arithmetic unit, processing the floating point value using the mixed signal arithmetic unit to create at least one new floating point value based on the processing, and storing the at least one new floating point value in registers associated with the mixed signal arithmetic unit.

According to some embodiments, a mixed signal arithmetic unit is provided that comprises a mixed signal adder capable of adding two digital values, two analog values, and an analog and a digital value with either an analog or digital result, a mixed signal multiplier capable of multiplying two digital values, two analog values, and an analog and a digital value with either an analog or digital result, overflow detector elements for said adder and said multiplier for maintaining output values in defined ranges, scaler elements operatively interconnected with said overflow detector elements for said adder and said multiplier for maintaining output values from said adder and said multiplier in defined ranges, and a program control unit for monitoring and controlling said mixed signal adder, said mixed signal multiplier, and elements as a function of the types of input signals and desired operation to be performed by said mixed signal arithmetic unit.

According to some embodiments, a mixed signal adder is provided that comprises one or more digital to analog and analog to digital conversion elements, a digital to digital adder element, an analog to analog adder element, sign management elements for the inputs to said mixed signal adder, sign management elements for the outputs from said mixed signal adder, overflow detector elements for detecting output values outside of defined ranges, scaler elements operatively interconnected with said overflow detector elements for maintaining output values within defined ranges, and a program control unit for monitoring and controlling said elements as a function of the types of input signals for said mixed signal adder.

According to some embodiments, a mixed signal multiplier is provided that comprises one or more digital to analog and analog to digital conversion elements, a digital by digital multiplier element, an analog by analog multiplier element, an analog by digital multiplier element, sign management elements for inputs to said mixed signal multiplier, sign management elements for the outputs from said mixed signal multiplier, overflow detector elements for detecting output values outside of defined ranges, scaler elements operatively interconnected with said overflow detector elements for maintaining output values within defined ranges, and a program control unit for monitoring and controlling said elements as a function of the types of input signals for said mixed signal arithmetic unit.

According to some embodiments, a mixed signal arithmetic unit is provided that comprises at least one digital signal input and at least one digital signal output; at least one analog signal input and at least one analog signal output; one or more digital to analog conversion elements and one or more analog to digital conversion elements; at least one mixed signal adder with input and output scalers and a plurality of logic elements capable of being configured as an overflow detector on the output of said adder for maintaining output values in defined ranges and capable of performing arithmetic operations on two or more values, wherein said values may be one or more of: digital values, analog values, a combination of analog and digital; at least one mixed signal multiplier with input and output scalers and a plurality of logic elements capable of being configured as an overflow detector on the output of said multiplier for maintaining output values in defined ranges and capable of performing arithmetic operations on two or more values, wherein said values may be one or more of: digital values, analog values, and a combination of analog and digital values; and at least one controller for monitoring and controlling said mixed signal adder, said mixed signal multiplier, said inputs, said outputs, and said conversion elements as a function of the types of input signals, desired output signals and the desired arithmetic operation for said mixed signal arithmetic unit to perform on said input signals.

In some embodiments, said analog values are in a mixed signal floating point format or a floating point format. In some embodiments, said mixed floating point format comprises: a sign bit, an analog mantissa value and an exponent value. In some embodiments, said floating point format comprises: an analog mantissa value and an exponent value. In some embodiments, said analog values are in a continuous or a sampled format.

In some embodiments, the mixed signal arithmetic unit further comprises one or more sign management elements under control of said at least one controller.

In some embodiments, said plurality of logic elements comprises: at least one first comparator configured to determine whether an analog input or output value is lower than a predetermined minimum value, at least one second comparator configured to determine whether an analog input or output value is lower than a predetermined maximum value, and at least one third comparator configured to determine whether an analog input or output value is higher than a predetermined percentage of said predetermined maximum value.

According to some embodiments, a mixed signal adder capable of arithmetic operations on: (i) a plurality of input digital values, (ii) a plurality of input analog values, and (iii) a plurality of input digital values with a plurality of input analog values, the mixed signal adder configured to: receive: (i) said plurality of input digital values, (ii) said plurality of input analog values or (iii) said plurality of input digital values and said plurality of input analog values; perform an arithmetic operation to generate an output value, said output value comprising the result of an arithmetic operation on: (i) said plurality of input digital values, (ii) said plurality of input analog values or (iii) said plurality of input digital values and said plurality of input analog values; and transmit said output value, wherein said output value is an analog output value or a digital output value.

According to some embodiments, a mixed signal multiplier capable of arithmetic operations on: (i) a plurality of input digital values, (ii) a plurality of input analog values, and (iii) a plurality of input digital values with a plurality of input analog values, the mixed signal multiplier configured to: receive: (i) said plurality of input digital values, (ii) said plurality of input analog values, and (iii) said plurality of input digital values with a plurality of input analog values; perform an arithmetic operation to generate an output value, wherein said output value comprises the result of an arithmetic operation on: (i) said plurality of input digital values, (ii) said plurality of input analog values, or (iii) said plurality of input digital values with a plurality of input analog values; and transmit said output value, wherein said output value is an analog output value or a digital output value According to some embodiments, a mixed signal arithmetic unit is provided that comprises at least one mixed signal adder capable of performing arithmetic operations on: (i) a plurality of input digital values, (ii) a plurality of input analog values, and (iii) a plurality of input digital values and a plurality of input analog values, the mixed signal adder configured to perform one or more arithmetic operation to generate an output value, said output value resulting from the completed performance of the one or more arithmetic operation on said input values to said adder; at least one mixed signal multiplier capable of performing arithmetic operations on: (i) a plurality of input digital values, (ii) a plurality of input analog values, and (iii) a plurality of input digital values and a plurality of input analog values, the mixed signal multiplier configured to perform one or more arithmetic operation to generate an output value, said output value resulting from the completed performance of the one or more arithmetic operation on said input values to said multiplier; at least one mixed signal floating point multiplier capable of performing arithmetic operations on a plurality of input mixed signal floating point analog values, the mixed signal floating point multiplier configured to perform one or more arithmetic operation to generate an output value, said output value resulting from the completed performance of the one or more arithmetic operation on said input mixed signal floating point analog values; and a controller for monitoring and controlling said at least one mixed signal adder and said at least one mixed signal multiplier as a function of the types of input values and the desired arithmetic operation for said mixed signal arithmetic unit.

These and other features of the invention will become apparent to those skilled in the art from the following detailed description of the invention, taken together with the accompanying drawings.

BRIEF DESCRIPTION OF THE DRAWINGS

FIGS. 11A-11D depict a FIR filter according to some embodiments.

DETAILED DESCRIPTION

Figure 1:
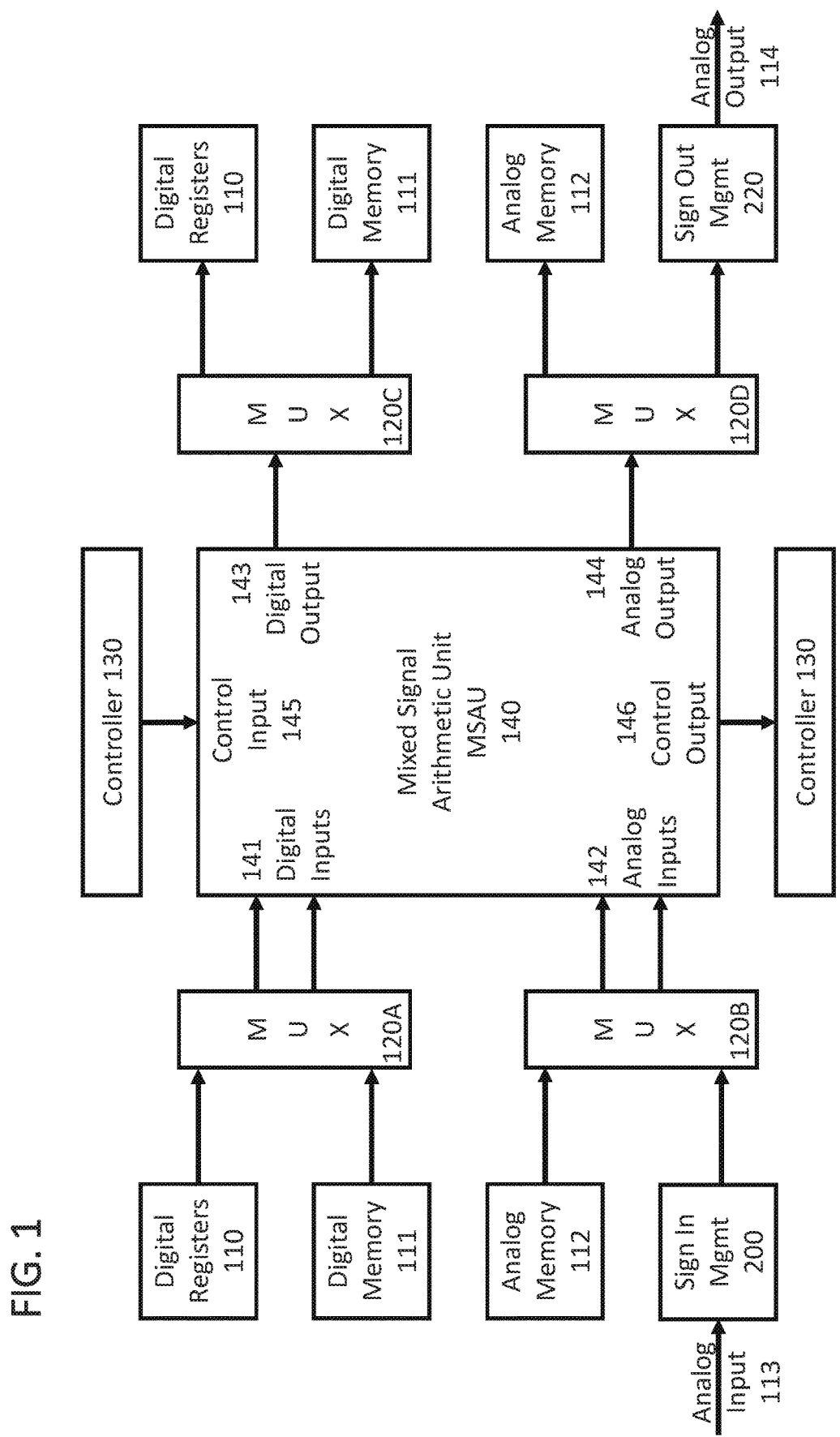
FIG. 1 depicts a block diagram for a mixed signal arithmetic logic unit according to some embodiments.

During the decades of the 1960s and 1970s, Digital Signal Processing emerged and allowed digital computers to manipulate the real world analog signals once they were sampled and converted to digital signals. Digital Signal Processing performed well in meeting the needs of the industry during the following five decades. But, just as with any technology, the digital signal processing computer did not keep up with the demands of the signals and opportunities that were emerging.

Initially, when microprocessors such as the digital signal processor became practical, there seemed to be no problems it could not solve and new applications abounded. But as the technology has matured the digital microprocessor performance has become limited.

Digital processing may be applicable, for instance, in:
Cell phones
Digital music
Digital TV
Autonomous vehicles
Medical diagnostic tools Aspects of the present disclosure recognize that new opportunities are emerging in areas such as neural networks, the Internet of Things (IoT), cloud computing, and image understanding which are demanding the capability of both analog computing elements and digital computing elements. The evolution of the digital computer has moved from performance metrics of thousands of instructions per second to billions of instructions per seconds, thousands of bytes of memory to trillions of bytes of memory, from watts of power per instruction to nano-watts of power per instruction, and from dollars per transistor to billions of transistors per dollar. All of these advances thus far have taken the computer out of the laboratory and put it into our pockets.

But, some interesting signals are still processed in the analog domain. For example, RF may be processed in analog before being translated down to baseband where the signal is converted to digital for further processing. While the bandwidth of the interesting RF signals continues to increase, the advances of analog to digital conversion have not kept pace.

In fact, the limits of digital processing are being approached in multiple aspects. Raw performance is nearing its practical limits. As an industry, the solution has been to take sophisticated digital processing architectures and populate many of them on one semiconductor substrate, giving multi-core processing capability. But even with multi-core Systems on a Chip (SoC) computing elements, the performance demands of many new emerging market opportunities are not being met. At the same time, the power consumption of these high performance digital processing elements is exceeding the ability for the system they are in to power them and cool them. Further, the costs of these high performance digital processing elements are no longer affordable for many applications.

That is where the analog computing elements begin to shine for these new emerging opportunities. To put this in perspective, the basic computational element of a computer, the Arithmetic Logic Unit (ALU) is comprised of math, logic and control units. The key to the raw performance of a computer is the math unit and particularly the multiplier. In the mid-1970s, the hardware multiplier was integrated into the microprocessor. In doing so, the digital signal processing (DSP) era for the semiconductor industry began. It became the defining item of raw performance of the ALU. In simple terms, the multiplier in a digital computer requires on the order of tens of thousands of transistors. While in the analog domain, a multiplier may only require anywhere from 1 to 10 transistors. In terms of raw performance, this means the analog multiplier may perform a multiply in a few gate delays rather than thousands of gate delays in its digital equivalent. Thus the analog multiply may be several of orders of magnitude faster than a digital multiply. At the same time due to its need for fewer transistors, its power dissipation is several orders of magnitude lower than its digital equivalent. The same relationship exists when comparing the cost of the two multipliers.

However, when compared to the digital computer, several issues continue to face the analog computer: its analog memory; its programmability; its noise, drift and accuracy; and its use of continuous data versus sampled data.

In the digital world, memories are binary, or in powers of two. This may make it better for storing information, keeping the information for long periods of time and protecting against accumulating noise. Analog memories, on the other hand are notorious for their non-linear effects on the data that are being stored, poor at long term storage, and are susceptible to corruption by any noise it may encounter.

The common use of a system using sampled data (e.g. a sampled data system) has followed from the widespread adoption of the digital computer for signal and data processing. For the analog world most signals are real world continuous signals. But knowing how to manipulate signals in a sampled data system, makes using continuous data in a system seem quite foreign and difficult to handle. However, the present disclosure provides a mixed signal computer that utilizes the strengths of both analog and digital computers.

Referring now to FIG. 1, a mixed signal arithmetic unit (MSAU) 140 that may process both digital and analog data is depicted. According to some embodiments, the MSAU 140 may comprise at least one or more mixed signal adders 500 and at least one or more mixed signal multipliers 600. The mixed signal adder 500 is described later herein in further detail with regard to discussions of FIG. 5 and the mixed signal multiplier 600 is described later herein in further detail with regard to discussions of FIG. 6. The MSAU 140 may store digital data in digital registers 110 or in a digital memory element 111 (e.g., a digital memory, a digital memory word or a digital memory cell). The MSAU 140 may store analog data in an analog memory element 112 (e.g., an analog memory word or an analog memory cell) or receive analog data directly from an analog input 113 convert the received analog data to a sign/magnitude representation (e.g., a floating point value) by an Input Sign Management Unit (ISMU) 400. The ISMU 400 is described later herein in further detail with regard to discussions of FIG. 4A. The digital and analog data may propagate through a series of multiplexers ("muxes") 120A-B or interconnects so that the data may be available at the digital inputs 141 and/or analog inputs 142 of the MSAU 140. In some embodiments, the data at the digital inputs 141 and the analog inputs may be available at the same time, wherein each of the muxes 120A-B may include one or more ADCs and DACs with appropriate interconnects. Based on program control input 145 from a controller 130, the MSAU 140 may perform the desired arithmetic operation on the inputs to produce a digital output 143 and/or an analog output 144. The outputs 143, 144 may then flow through a series of multiplexers ("muxes") 120C-D or interconnects to direct the outputs to the appropriate location in memory or I/O space. For example, the digital output 143 may be stored back in digital registers 110 or digital memory element 111, and the analog output 144 may be stored back in the analog memory element 112 or go directly to an analog output 114 after it has been converted from its internal sign magnitude representation (i.e., the floating point value) to a real world analog signal by an Output Signal Management Unit (OSMU) 420. The OSMU 420 is described later herein in further detail with regard to discussions of FIG. 4B. As part of the arithmetic operation, the MSAU 140 may generate control output 146 that may then flow back into the controller 130 logic for the next operation or to provide information to a controller about the results of the operation, such as overflow or carry flags.

Figure 2A:
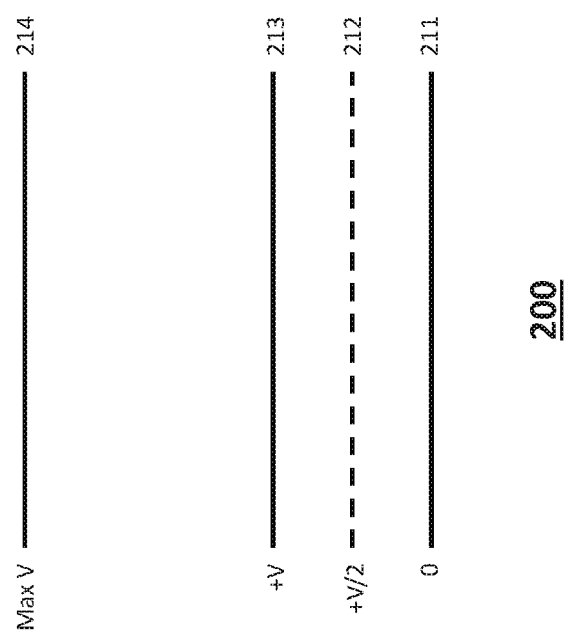
FIG. 2A depicts voltage levels of a signal according to some embodiments.
Figure 2B:
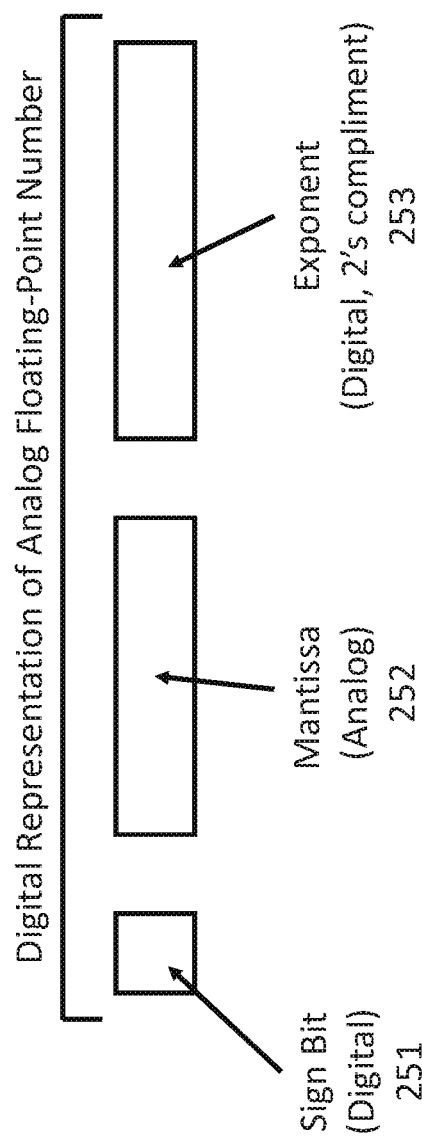
FIG. 2B depicts a mixed signal floating point number according to some embodiments.

Referring now to FIGS. 2A-B, management of the amplitude for analog signals according to some embodiments is described. FIG. 2A depicts the voltage levels 211, 212, 213, 214 that may be used by the MSAU 140, according to some embodiments. In the example shown in FIG. 2A, it is assumed that for a sign magnitude analog signal, the lowest possible voltage level is zero 211, i.e., "0." The maximum signal value is +V 213. Two other values are defined as +V/2 212 and Max V 214. The +V/2 212 is a half scale voltage level, that is a half scale voltage of the maximum signal value +V 213. The Max V 214 is an absolute maximum voltage. According to certain embodiments, the purpose of these four voltage levels is to provide decision points for an overflow detection unit (ODU) 300 as shown and described later herein in further detail with regard to discussions of FIG. 3A. For example, when a signal voltage level is detected to be above the half scale voltage +V/2 212, but less than the maximum signal value +V 213, the ODU 300 may instruct an output scaler to reduce an output signal by half. In some embodiments, the output scaler may comprise a scaler 350 as shown, for example, in FIG. 3B. As another example, when the signal voltage level is detected to be greater than the maximum signal value +V 213, but less than the absolute maximum voltage Max V 214, the ODU 300 may instruct an input scaler to reduce the one or more input signals by half and perform the operation again. In some embodiments, the input scaler may comprise the scaler 350 as shown and described later herein in further detail with regard to discussions of FIG. 3B.

FIG. 2B depicts an analog floating point (AFP) number format 250, according to some embodiments. This format 250 may be used by MSAU 140. In some embodiments, the AFP number format 250 comprises three components: a sign bit 251 which may be stored as a digital value, a mantissa 252 which may be stored as an analog absolute value, and an exponent 253 which may be stored as a digital 2s compliment number.

Figure 3A:
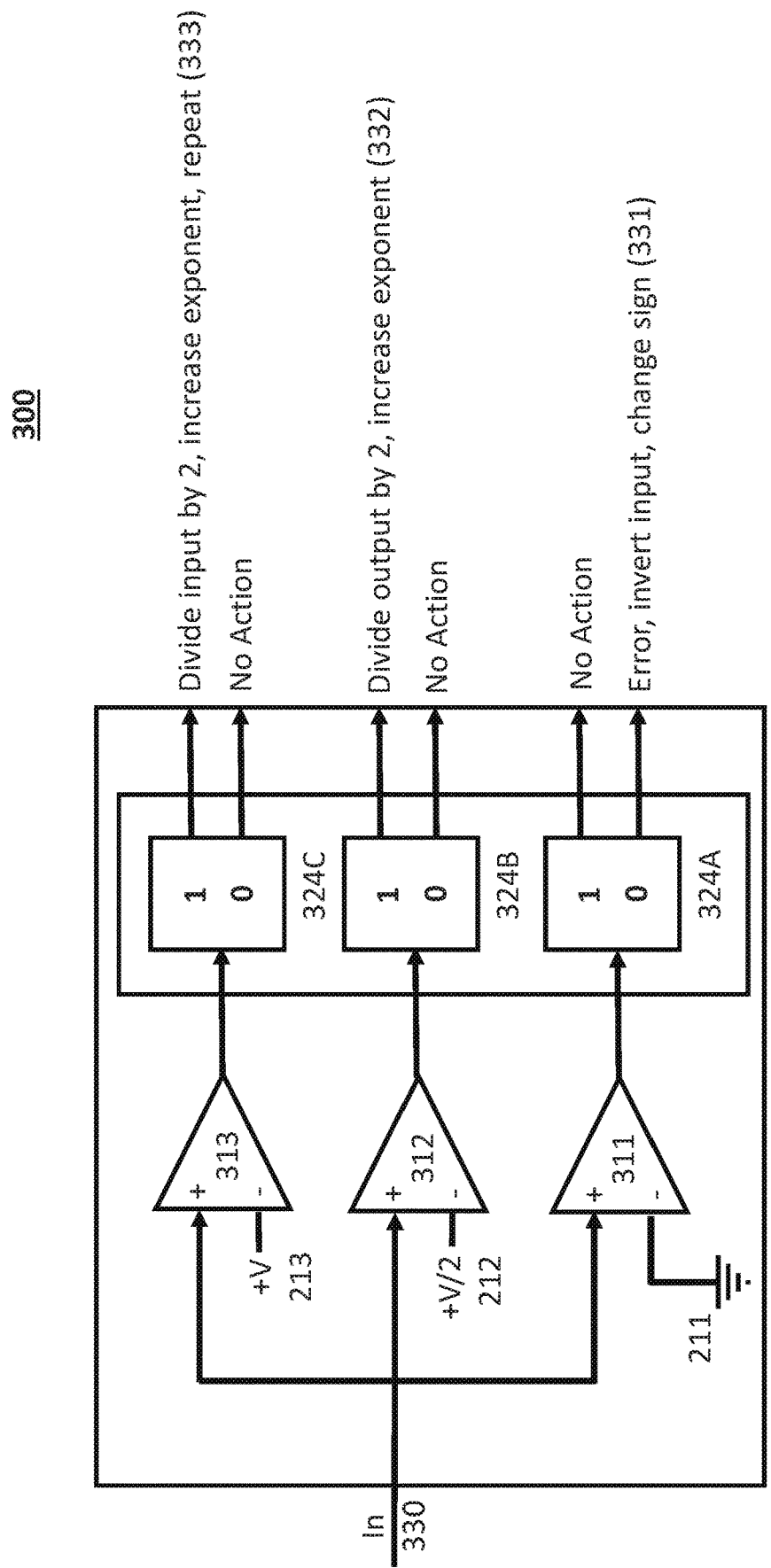
FIG. 3A depicts an overflow detector according to some embodiments.

FIG. 3A depicts a block diagram of the ODU 300 according to some embodiments. The ODU 300 is configured to prevent output values from an arithmetic unit (e.g. an adder or a multiplier as described in further detail below in FIGS. 5, 6, and 10) from overflowing. In other words, the ODU 300 is configured to keep output values from the arithmetic unit within predefined ranges. As shown in FIG. 3A, the ODU 300 receives the output from the arithmetic unit and makes three comparisons using three threshold detectors 311, 312, 313 according to some embodiments. A first threshold detector 311 may be configured to determine whether the signal voltage level of the output from the arithmetic unit is less than the lowest possible signal voltage level. If the voltage level of the output is lower than the lowest possible signal voltage level, the first threshold detector 311 sends a "0" out to the action block 324A and a subsequent error signal 331 is sent to the control logic for appropriate action. If the voltage level of the output is higher than the lowest possible signal voltage level, the first threshold detector 311 sends a "1" out to the action block 324 and no further action is necessary. A second threshold detector 312 determines if the signal voltage level of the output is less or greater than a predetermined voltage. In some embodiments, the predetermined voltage is V/2 212. If the signal voltage level of the output is less than the predetermined voltage, the second threshold detector 312 sends a "0" out to action block 324B and no further action is necessary. If the signal voltage level of the output is greater than the predetermined voltage, the second threshold detector 312 sends a "1" out to action block 324B, and subsequently the ODU 300 instructs an output scaler to reduce the output by half 332. In some embodiments, the ODU 300 may instruct the output scaler to reduce the output by a predetermined percentage. A third threshold detector 313 determines if the signal voltage level of the output is greater or less than V 213. If the signal voltage level of the output is less than V 213, the third threshold detector 313 sends a "0" out to action block 324C and no further action is necessary. If the signal voltage level of the output is greater than V 213, the third threshold detector 313 sends a "1" out to action block 324C, and subsequently the ODU 300 instructs 333 an input scaler to reduce the inputs by half and repeat the math function by the arithmetic unit. In some embodiments, the ODU 300 may directly instruct, or via controller 130 instruct, input scaler to reduce the input by a predetermined percentage. In some embodiments, the input scaler and the output scaler may each comprise a signal scaler unit (SSU) 350 as shown and described herein below in further detail with regard to discussions of FIG. 3B.

Figure 3B:
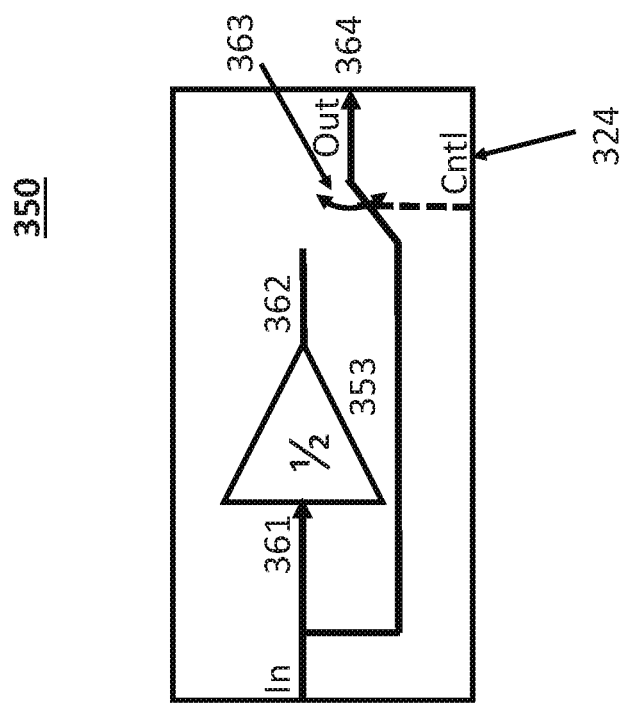
FIG. 3B depicts a scaler according to some embodiments.

FIG. 3B depicts the signal scaler unit (SSU) 350, according to some embodiments. As shown in FIG. 3B, the SSU 350 comprises a divider 353 configured to produce a divided signal 362 by reducing an input signal 361 by half. In some embodiments, the divider 353 may be configured to reduce the input signal 361 by a predetermined percentage. A switch 363 may be used to determine which of the signal choices, e.g. the input signal 361 or the divided signal 362, is provided as an output 364. In some embodiments, the switch may be controlled by an output 324 from the ODU 300, or controller 130.

Figure 4A:
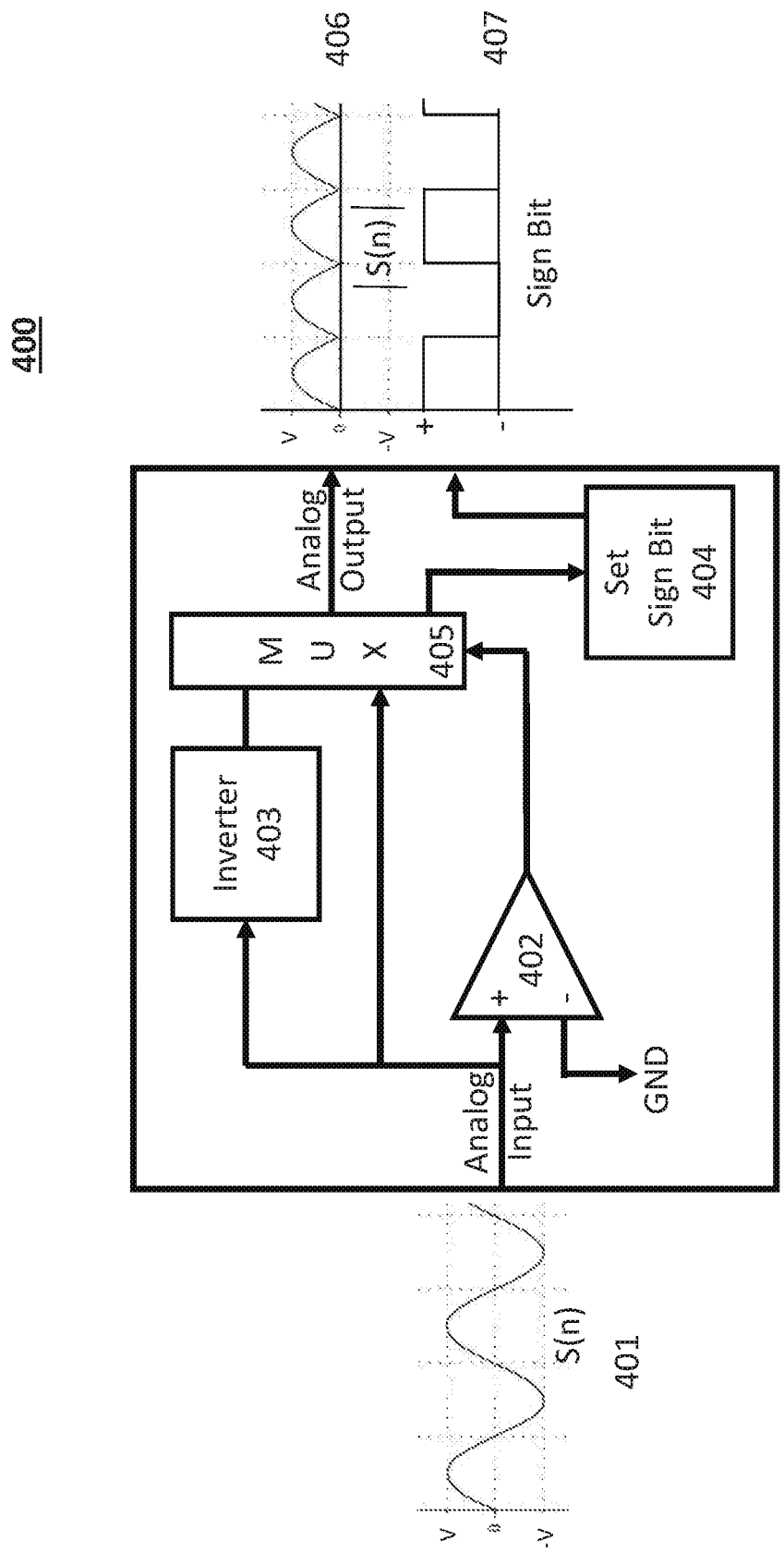
FIG. 4A depicts an input sign management unit according to some embodiments.

Referring now to FIG. 4A, an exemplary embodiment of preprocessing input analog signals 113 that are input to the mixed signal arithmetic unit (MSAU) 140 is shown. FIG. 4A depicts one embodiment of an input sign management unit (ISMU) 400. An analog signal 401 is input to the ISMU 400 in order to prepare the signal for additional processing by the MSAU 140. As shown in FIG. 4A, the analog signal 401 may have both positive and negative values. In some embodiments, the MSAU 140 may require an input value to be between zero 211 and the maximum signal value +V 213. In alternative embodiments, the MSAU 140 may accept input signals varying from −V to +V or from −V to zero volts. An inverter 403 may be configured to invert the input analog signal 401. Accordingly, the inverted and non-inverted versions of the input analog signal 401 may be input to a MUX 405. In some embodiments, the input analog signal 401 is also input to a threshold detector 402 and an output of the threshold detector 402 is input to the MUX 405. The MUX 405 may be configured to determine which version of the input analog signal 401, e.g. the inverted or the non-inverted version, is output based the received output from the threshold detector 402. Accordingly, an analog output 406 of the MUX 404 may comprise only positive values as shown in FIG. 4A. A set sign bit function 404 is configured to set a sign bit 407 for the analog output 406 depending on which version of the input analog signal 401 is chosen by the MUX 405. In some embodiments, the sign bit 407 will follow the analog output 406 through the MSAU 140. Accordingly, one output of the ISMU 400 comprises the analog output 406, i.e. an absolute value representation of the input signal, and the sign bit 407 for the analog output 406.

Figure 4B:
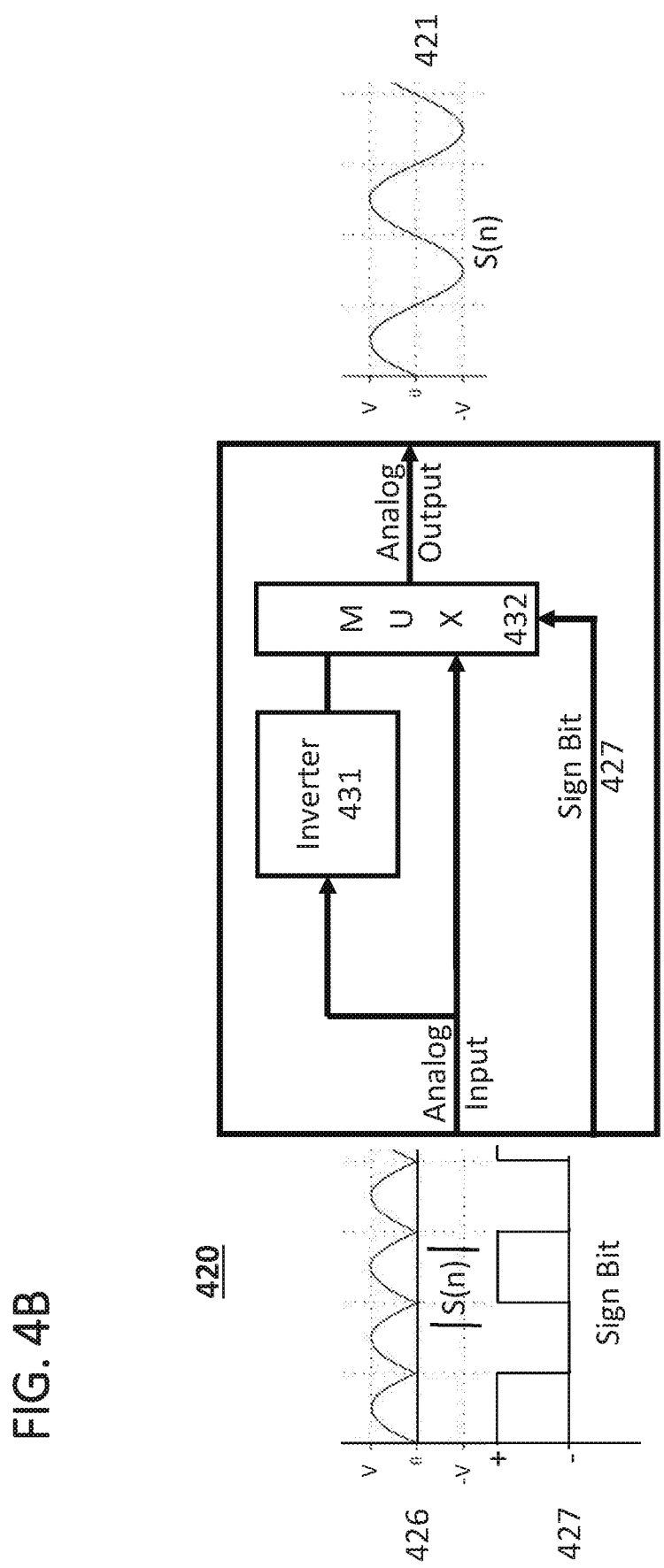
FIG. 4B depicts an output sign management unit according to some embodiments.

Referring now to FIG. 4B, an exemplary embodiment for processing analog outputs 144 from the MSAU 140 to produce output analog signals 114 is shown. FIG. 4B depicts one embodiment of the output sign management Unit (OSMU) 420. The OSMU 420 may receive an analog output 426, e.g. the |S(n)| signal, and an output sign bit 427 from the MSAU 140 and convert the outputs 426, 427 back to an analog signal 421. An inverter 431 may be configured to invert the analog output 426. Accordingly, the inverted and non-inverted versions of the analog output 426 are input to a MUX 432. The MUX 432 may be configured to receive the output sign bit 427 and determine which version of the analog output 426, e.g. the inverted or the non-inverted version, is output based on the received output signal bit 427 to create the analog signal 421.

Figure 4C:
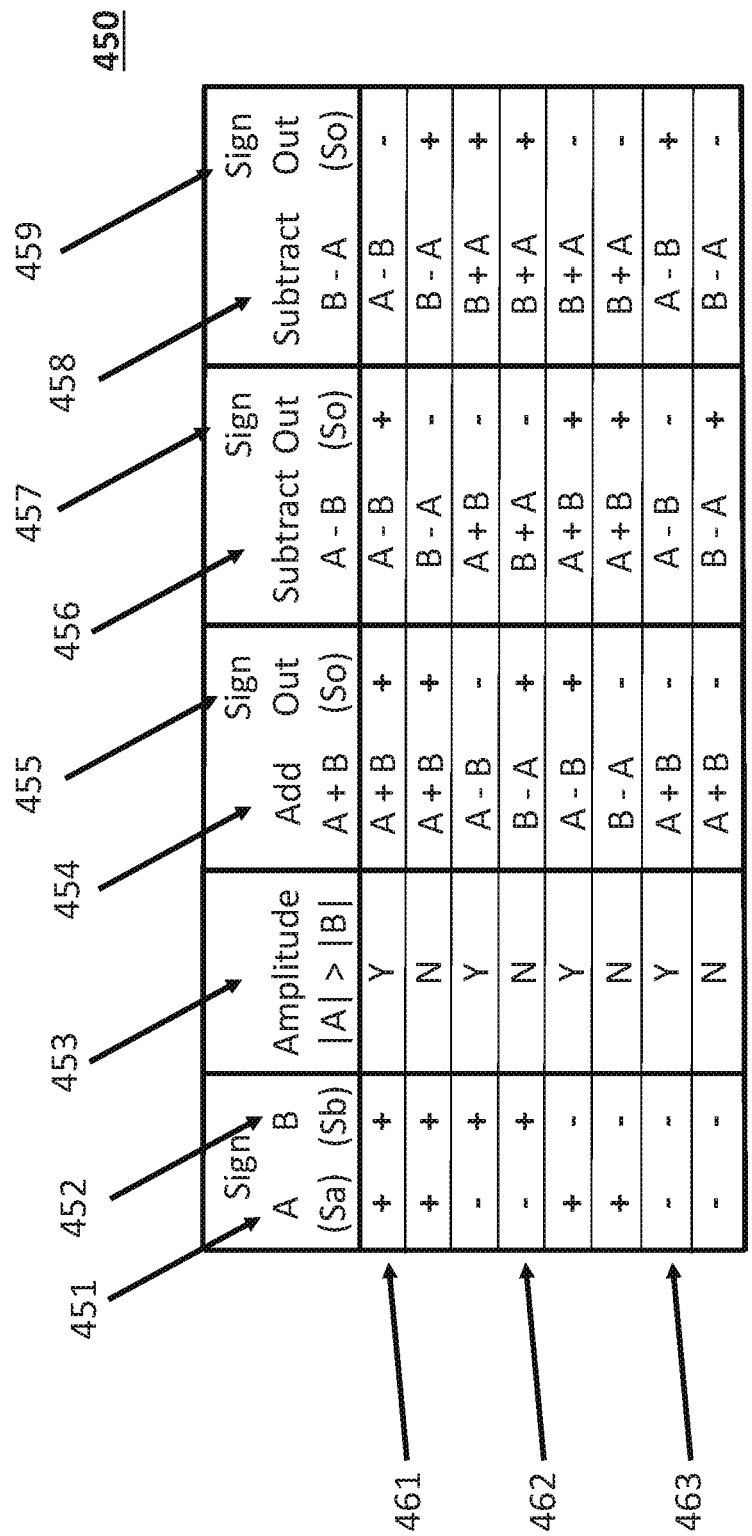
FIG. 4C shows a table describing sign bit management in an arithmetic logic unit according to some embodiments.

FIG. 4C depicts a table 450 which shows how a sign bit may be managed through various arithmetic units in the MSAU 140, according to some embodiments. The first two columns 451, 452 of the table 450 depict the options for the sign bits of two inputs, A and B, respectively. Column 453 shows a comparison of the magnitude for each input sample pair A and B. Column 454 shows the variations of an addition function with the resulting sign bit listed in column 455. As shown in table 450, there may be two options for subtraction regarding the two inputs. One option in which B is subtracted from A is depicted in columns 456 and 457, and the other option in which A is subtracted from B is depicted in columns 458 and 459.

Three examples of how the sign bit is managed through various arithmetic units are now described below using rows 461, 462 and 463 of table 450. Referring to row 461 of table 450 as a first example, a resulting sign of an addition of A+B, a subtraction of A−B, and a subtraction of B−A is shown according to some embodiments. As shown in table 450, columns 451 and 452 for row 461 indicate that the signs for A and B are both "+" and column 453 indicates that A is larger than B. Accordingly, the sign of the result of the addition of A+B 454 is shown as + in column 455. Looking next at column 457, the table 450 shows that a sign of the result of A−B in column 456 is positive when A is larger than B 453. Similarly, the sign of the result the subtraction of B−A 458 is negative 459 when A is larger than B 453. Referring to row 462 of table 450 as a second example, A has a negative sign 451, B has a positive sign 452, and B is greater than A 453. As shown in row 462, the signs for the results of the addition and the two subtractions are positive, negative, and positive, respectively. Referring to row 463 as a third example, both A 451 and B 452 have a negative sign and A is larger than B 453. As shown in row 463, the signs for the results of the addition and the two subtractions are negative, negative, and positive, respectively.

Figure 5:
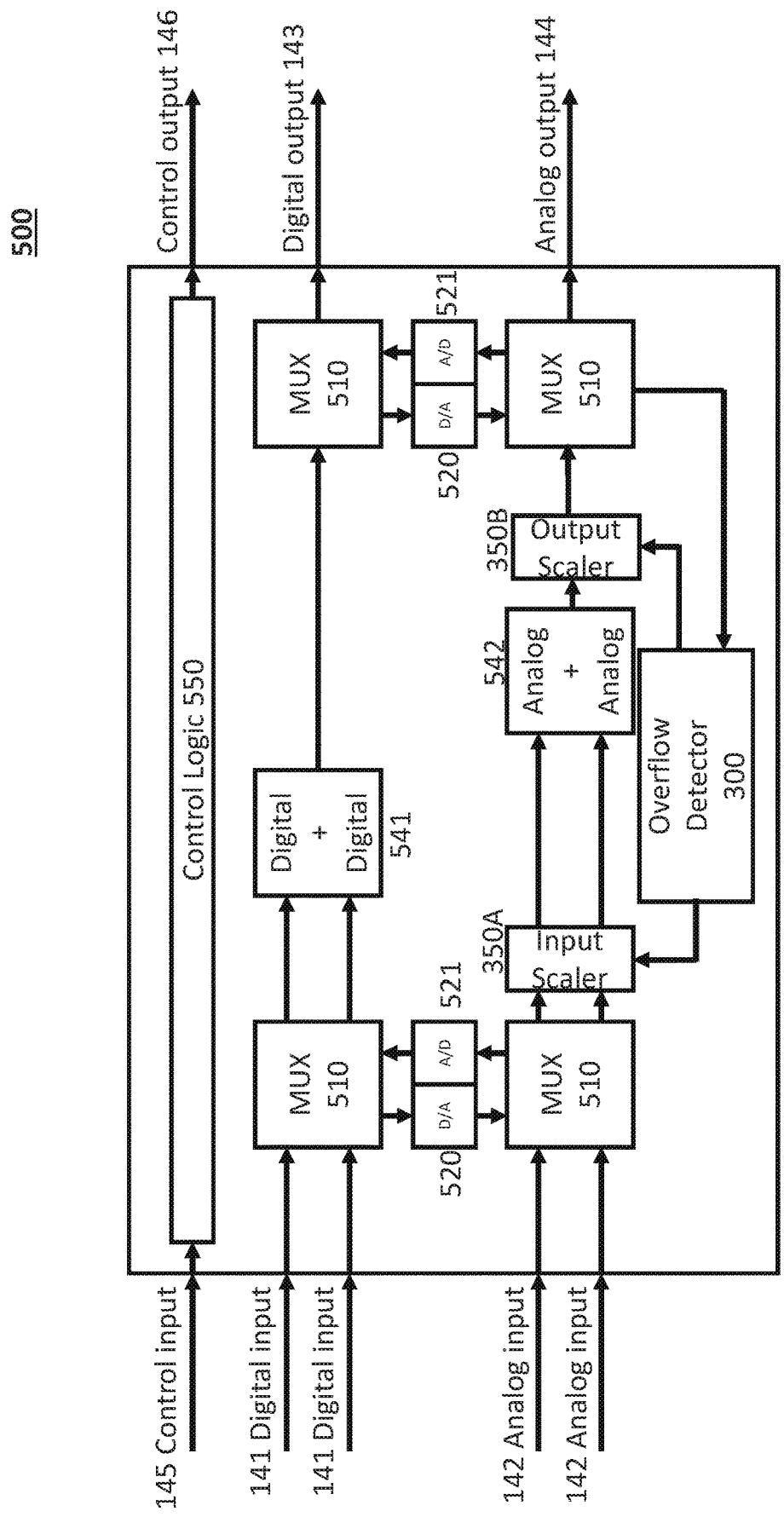
FIG. 5 depicts a block diagram of a mixed signal adder according to some embodiments.

FIG. 5 depicts one embodiment of the mixed signal adder 500. As shown in FIG. 5, the mixed signal adder 500 may use a control input 145 along with a combination of digital inputs 141 and analog inputs 142 to add the inputs together and create a digital output 143 and/or analog output 144. To perform the operation, the mixed signal adder 500 may comprise a control logic 550 configured to set the configuration of muxes, 510, as well as a default state of one or more analog scalers 350A-B. The mixed signal adder 500 may be configured to add the digital inputs 141 and the analog inputs 142. In some embodiments, the mixed signal adder 500 may separately add the digital inputs 141 and the analog inputs 142 at the same time. The digital addition components 541 and analog addition components 542 may be configured such that the additions are processed within the mixed signal adder 500 either separately or in parallel.

In some embodiments, the mixed signal adder 500 may perform a digital addition 541, as directed by the control logic 550, on a digital input 141 and an analog input 142. In such embodiments, the control logic 550 may configure one or more analog-to-digital converters (ADCs) 521 such that the analog input 142 is flowed through the one or more ADCs 521 so that both operands may be in the digital domain. Similarly, in some embodiments, the mixed signal adder 500 may perform an analog addition 542 on a digital input 141 and an analog input 142, as directed by the control logic 550. In such embodiments, the control logic 550 may configure one or more digital-to-analog converters (DACs) 520 such that the digital input 141 is flowed through the one or more DACs 520 so that both operands may be in the analog domain. In some embodiments, the mixed signal adder 500 may perform a digital addition 541 on just the digital inputs 141. In such embodiments, the ADC 521 is not used. Similarly, in some embodiments, the mixed signal adder 500 may perform an analog addition 542 on just the analog inputs 142. In such embodiments, the DAC 520 is not used. In some embodiments, a combination of the DAC 520 and the ADC 521 may comprise an exchange register.

In some embodiments, the muxes 510 may be configured to create a digital output 143 or an analog output 144 once the addition by the addition components 541, 542 has been completed. In some embodiments, the control logic 550 may configure one or more DACs 520 such that a result of the digital addition 541 is flowed through the one or more DACs 520 to create the analog output 144. Similarly, the control logic may configure one or more ADCs 521 such that a result of the analog addition 542 is flowed through the one or more ADCs to create the digital output 143.

In some embodiments, the overflow detector 300 may be configured to detect that the results of the analog addition 542 exceed analog voltage bounds of the mixed signal adder 500, e.g. saturates, and modify an input scaler 350A to divide the analog inputs such that the result will not saturate. In some embodiments, the overflow detector 300 may be configured to modify an output scaler 350B in response to detecting that the results of the analog addition 542 exceed analog voltage bounds of the mixed signal adder 500. The results of the overflow from the output scaler 350B and analog addition 542 may then be used by the control logic 550 to create the control output 146. In some embodiments, the input scaler 350A and the output scaler 350B may each comprise the SSU 350 as shown in and described with reference to FIG. 3B.

Figure 6:
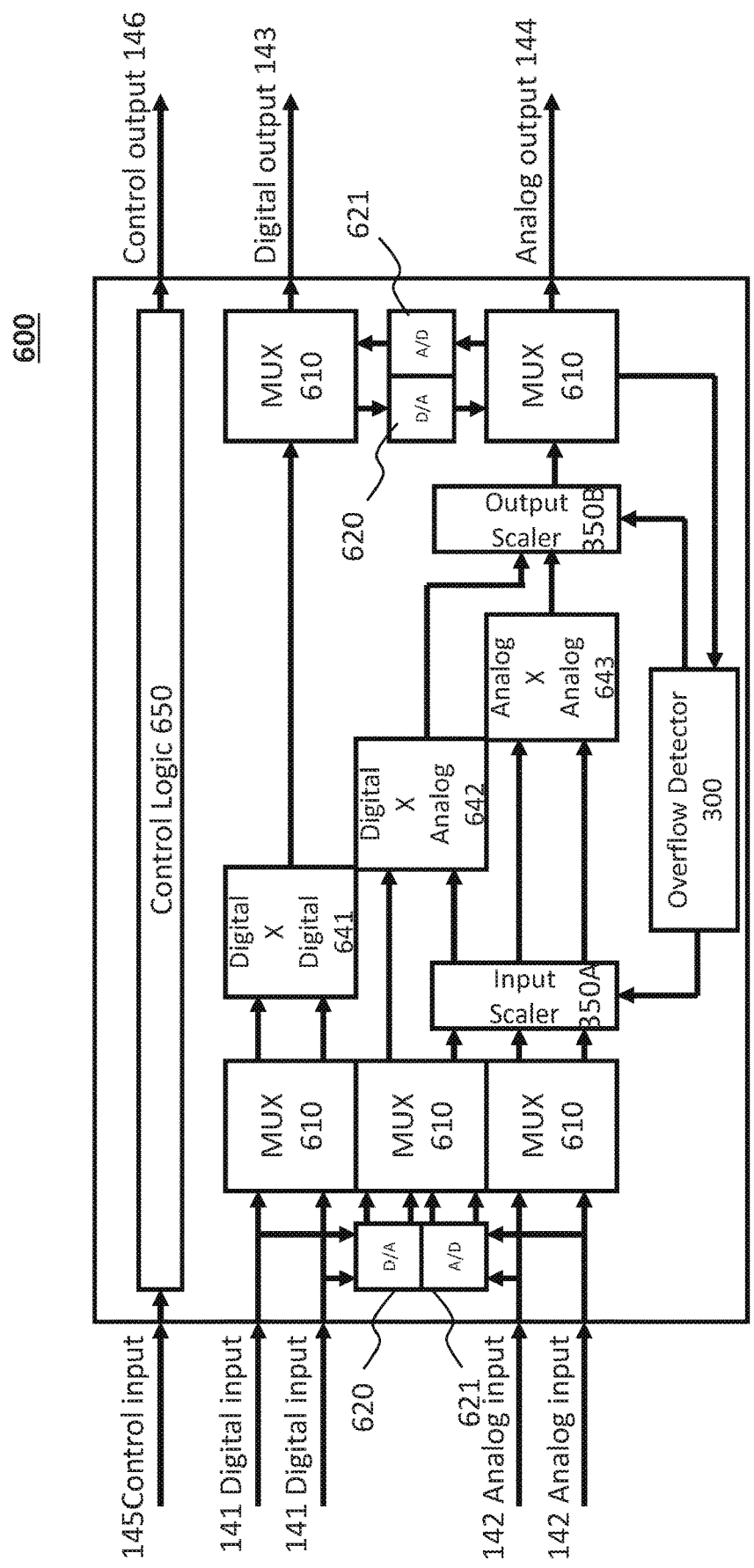
FIG. 6 depicts a block diagram of a mixed signal multiplier according to some embodiments.

FIG. 6 depicts one embodiment of the mixed signal multiplier 600. As shown in FIG. 6, the mixed signal multiplier 600 may use a control input 145 along with a combination of digital inputs 141 and analog inputs 142 to multiply the inputs together to create a digital output 143 and/or analog output 144. To perform the operation, the mixed signal multiplier 600 may comprise control logic 650 to set the configuration of the multiplexors, e.g. muxes 610, as well as a default state of the analog scalers 350A-B. The mixed signal multiplier 600 may be configured to multiply the digital inputs 141, multiply the analog inputs 142, and multiply a digital input 141 and an analog input 142. The digital multiplication components 641, the analog multiplication components 643, and the analog by digital multiplication components 642 may be configured such that the multiplications are processed within the mixed multiplier 600 either separately or in parallel.

In some embodiments, the mixed signal multiplier 600 may perform a digital multiplication, as directed by the control logic 650, on the digital input 141 and the analog input 142. In such embodiments, the control logic 650 may configure one or more analog-to-digital converters (ADCs) 621 such that the analog input 142 is flowed through the one or more ADCs 621 so that both operands may be in the digital domain. Similarly, in some embodiments, the mixed signal multiplier 600 may perform an analog multiplication, as directed by the control logic 650, on the digital input 141 and an analog input 142. In such embodiments, the control logic 650 may configure one or more digital-to-analog converters (DACs) 620 such that the digital input 141 flows through the one or more DACs 620 so that both operands may be in the analog domain. In some embodiments, the mixed signal multiplier 600 may perform a digital multiplication on just the digital inputs 141. In such embodiments, the ADC 621 is not used. Similarly, in some embodiments, the mixed signal multiplier 600 may perform an analog multiplication on just the analog inputs 142. In such embodiments, the DAC 620 is not used.

In some embodiments, the control logic 650 may configure the mixed signal multiplier 600 to perform a digital multiplication of the analog input. In such embodiments, the input for the digital multiplication of the analog input may come from any one of the digital inputs 141, the analog inputs 142, the DAC 620, and the ADC 621. In some embodiments, a combination of the DAC 620 and the ADC 621 may comprise an exchange register.

In some embodiments, the muxes 610 may be configured to create a digital output 143 or an analog output 144 once the multiplication by the multiplication components 641, 642, 643 has been completed. In some embodiments, the control logic 650 may configure one or more DACs 620 such that a result of the digital multiplication is flowed through the one or more DACs 620 to create the analog output 144. In some embodiments, the control logic 650 may configure one or more ADCs 621 such that a result of the analog multiplication or the digital multiplication of the analog input is flowed through the one or more ADCs 621 to create the digital output 143.

In some embodiments, the overflow detector 300 may be configured to detect that the results of the analog multiplication or the digital multiplication of an analog input exceed the selected analog voltage bounds described in FIG. 2A, i.e. saturates, and modify an input scaler 350A or an output scaler 350B to divide the analog inputs and/or outputs such that the result will not saturate. The results of the overflow from the output scaler 350B and digital multiplication 641 may then be used by the control logic 650 to create the appropriate control output 146.

Figure 7:
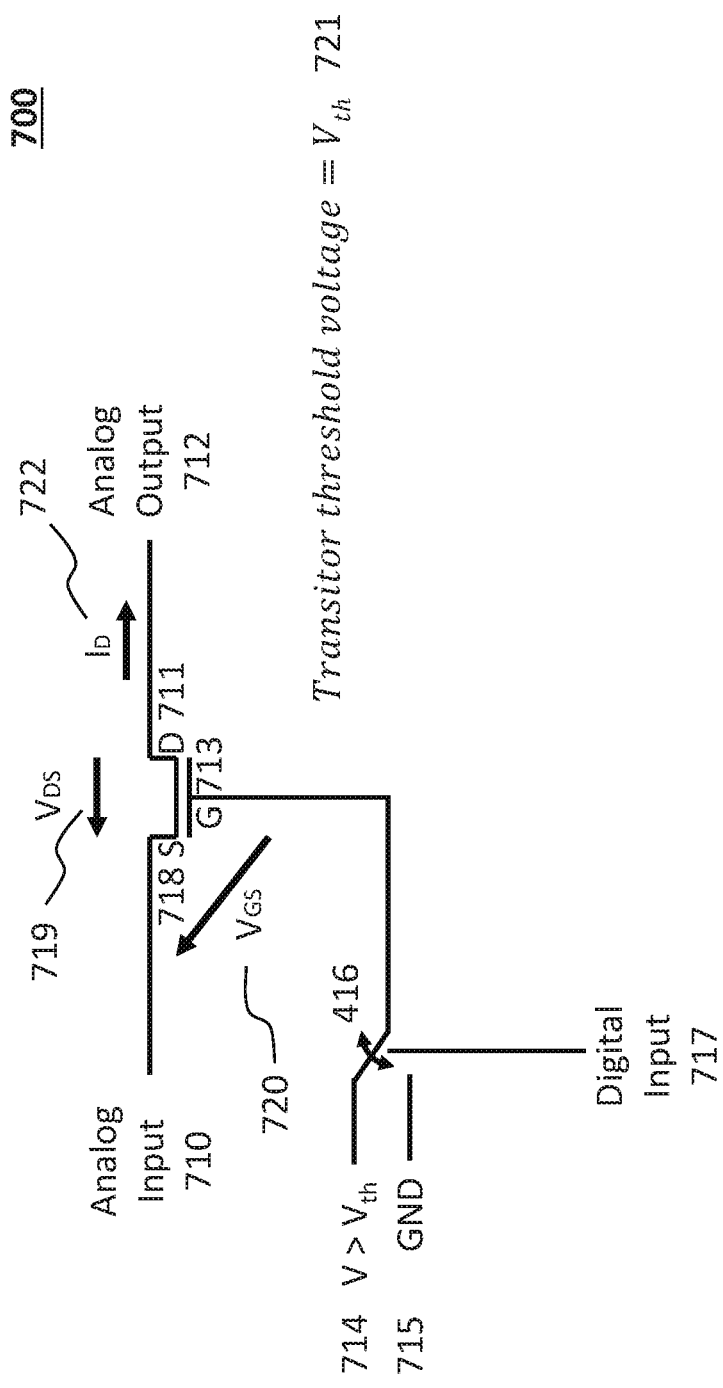
FIG. 7 depicts an analog multiplier according to some embodiments.

FIG. 7 illustrates one embodiment of an analog multiplier. As shown in FIG. 7, a single transistor 700 may be used to multiply an analog signal by a constant. This may be referred to as amplification. As shown in FIG. 7, the single transistor 700 is provided with a transistor threshold voltage 721, an analog input 710 and an analog output 712, according to one embodiment. The analog input 710 is connected to the source 718 of the transistor. The analog output 712 is connected to the drain 711 of the transistor. The input to the gate 713 of the transistor may be selected by a digital input 717. When the digital input 717 selects the GND input 715, the gate-to-source voltage 720 is less than the threshold voltage 721 of the transistor. Accordingly, the transistor is off and no multiplication occurs. When the digital input 717 selects a voltage greater than the threshold voltage 714, the transistor is on and multiplication may occur. The drain-to-source voltage 719 is multiplied (i.e. amplified) by the transistor which results in a drain current $I_D$ 722 given by equation 730.

Equation (1) provided below describes a transistor current $I_D$ in the triode mode or linear region of the transistor which may be used for multiplication.

$$I_D = \mu_n Cox \frac{W}{L}\left((V_{GS} + V_{th})V_{DS} - \frac{V_{DS}^2}{2}\right) \qquad (1)$$

where $V_{GS} > V_{th}$ and $V_{DS} < V_{GS} - V_{th}$

The charge-carrier effective mobility ($\mu_n$) and the gate oxide capacitance per unit area ($C_{ox}$) are constants that depend on the process in which the transistor is being manufactured. The width and length (W/L) of the transistor is a constant which depends on the layout of the transistor. The threshold voltage ($V_{th}$) of the transistor is a constant which depends on the oxide thickness. The gate-to-source voltage ($V_{GS}$) 720 is a constant chosen appropriately to satisfy the conditions provided for Equation (1), i.e. $V_{GS}>V_{th}$ and $V_{DS}<V_{GS}-V_{th}$. This means that in the linear region, the drain-to-source voltage ($V_{DS}$) is effectively multiplied by a constant to create the drain current $I_D$. There is some non-linearity due to the $V_{DS}^2/2$ term which may be controlled by ensuring that $V_{DS}$ 719 is much smaller than ($V_{GS}-V_{th}$). The width and length (W/L) of the transistor may be used to easily adjust the multiplication value of the transistor, given all other parameters remain the same. While only multiplication by a single transistor is discussed in this example, other embodiments could use multiple transistors in a push-pull configuration.

Figure 8:
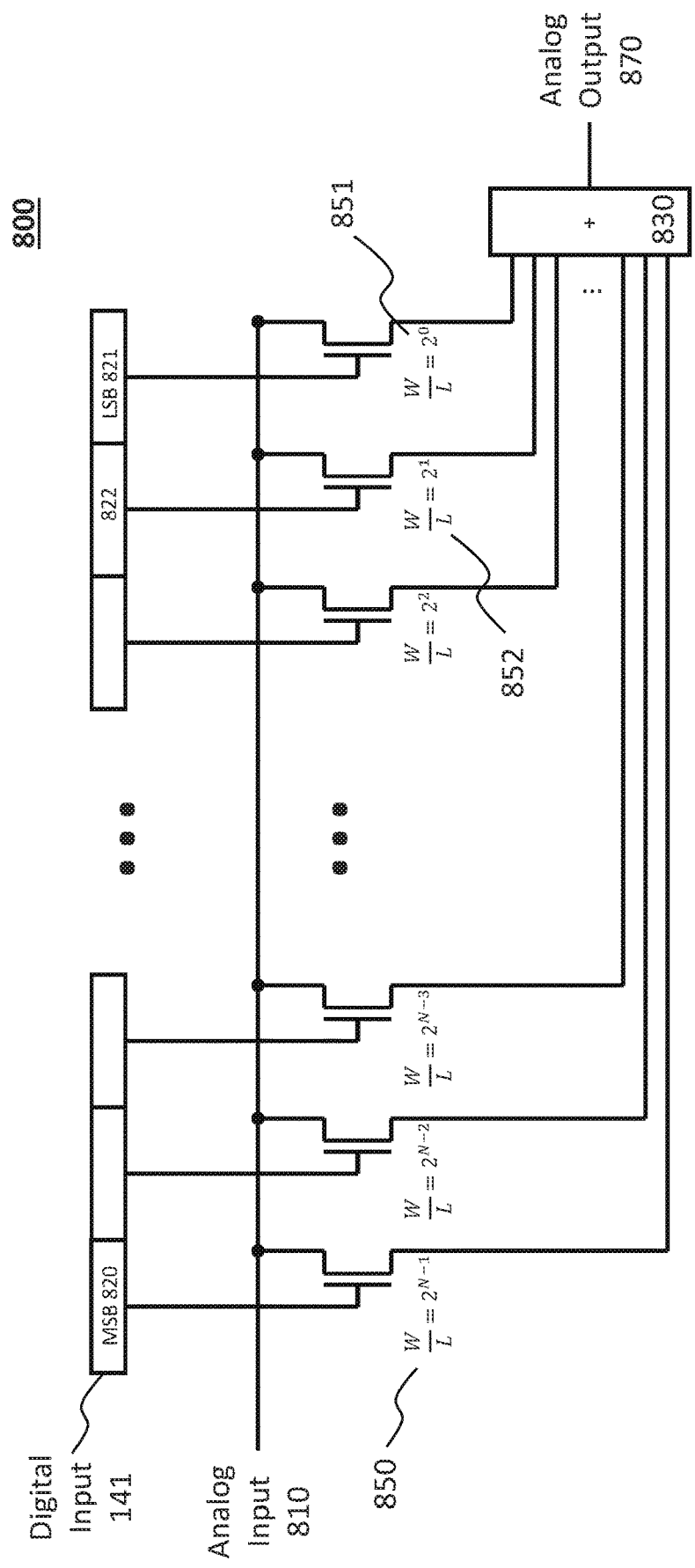
FIG. 8 depicts a mixed signal multiplier according to some embodiments.

Given that a transistor may be used to multiply an analog input by a constant 714, this may be extended to multiply an analog input 810 by a digital input 141 in some embodiments. Accordingly, FIG. 8 depicts one embodiment of a mixed signal multiplier 800. As shown in FIG. 8, the digital input 141 may comprise a number of bits ranging from the least significant bit (LSB) 821 to the most significant bit (MSB) 820. Each bit of the digital input 141 may be connected to a separate transistor gate. For example, the LSB 821 is connected to the gate of the least significant transistor 851, while the MSB 820 is connected to the gate of the most significant transistor 850. Each transistor may comprise a different width to length ratio, such that the width to length ratio of the transistor 852 connected to the LSB+1 bit 822 of the digital input 141 is twice that of the transistor 851 connected to the LSB bit 821 of the digital input 141. Similarly, each successive transistor may comprise a width to length ratio that is twice the previous ratio such that the MSB input 820 is connected to the gate of the transistor 850 that has a width to length ratio $2^{(N-1)}$ times the width the length ratio of the transistor 851 connected to the LSB 821, where N is the number of bits in the digital input 141.

If a bit of the digital input 141 is zero, the connected transistor will be off and the drain current of that transistor will be zero. If a bit of the digital input 141 is one, then the connected transistor will multiply the analog input 830 by a constant to result in a drain current given by 730. The drain current of all transistors will flow into a summing junction 830. The summing junction 830 may use summing techniques in order to create an analog output value which represents the result of the multiplication of the digital input 141 and the analog input 810.

Accordingly, the mixed signal multiplier 800 allows for an analog input, either continuous or sampled, to be multiplied by the constant, e.g. each bit of the digital input 141. Such an embodiment of the mixed signal multiplier 800 may be used in many applications. An exemplary application of this embodiment as a four tap Finite Impulse Response (FIR) filter will be discussed in further detail herein in discussions regarding FIGS. 11A-D. Other aspects of signal processing such as, but not limited to, infinite impulse response (IIR) filters, and/or other types of transformation may apply this embodiment of the mixed signal multiplier 800.

Figure 9:
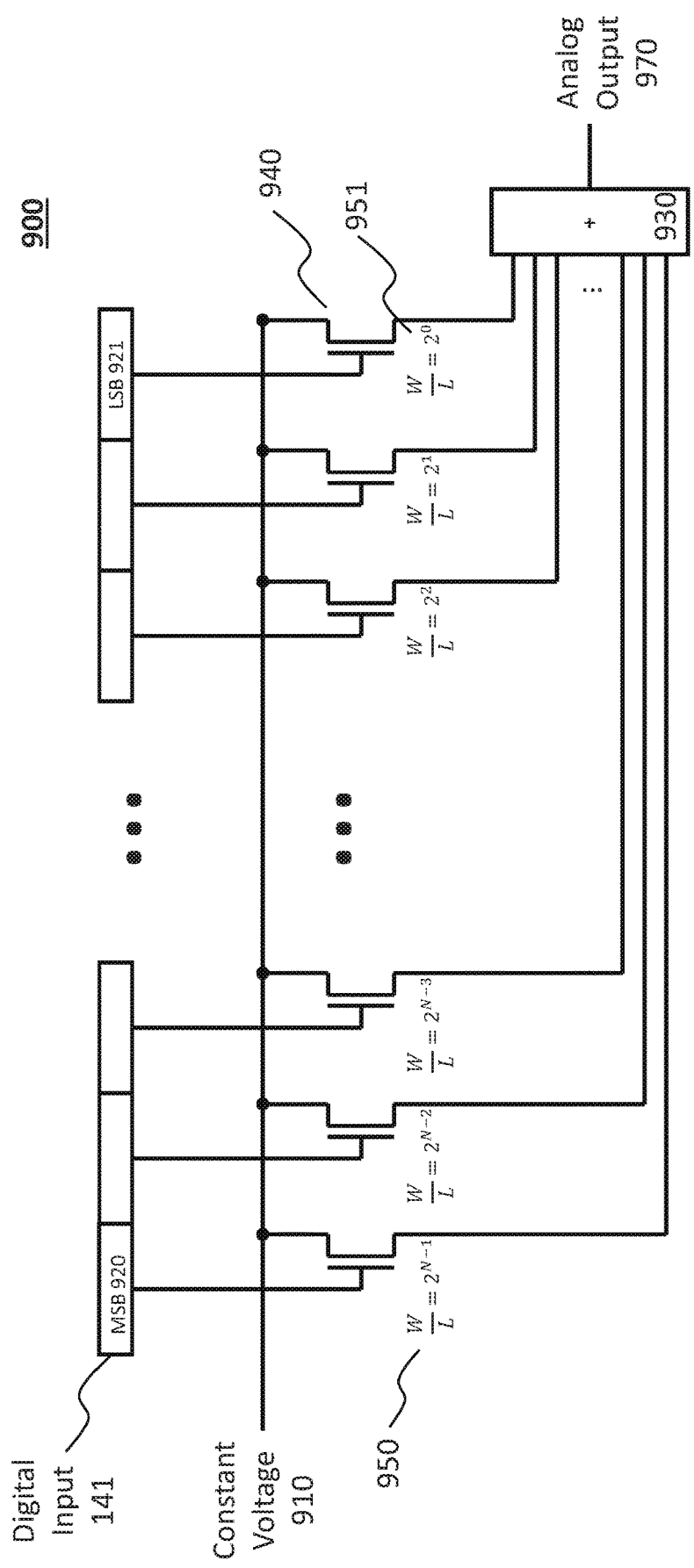
FIG. 9 depicts a digital-to-analog converter according to some embodiments.

Referring now to FIG. 9, a digital-to-analog converter (DAC) 900 may be created using the same circuitry used to multiply an analog input by a digital value 800. Instead of using the analog input 810 as described in FIG. 8, a constant voltage 910 may be used to implement the DAC 900. Traditionally, digital-to-analog conversion is performed using resistors which are space inefficient and do not necessarily scale with silicon process size reductions. The use of transistors, as explained in the current disclosure, for digital-to-analog conversion enables fast digital-to-analog conversion in a space efficient manner that is able to take advantage of advances in silicon process technology. The use of transistors for digital-to-analog conversion also allows for reuse of circuitry within the mixed signal arithmetic unit 140 since a digital-analog multiplier 642 may be configured to function as a digital-to-analog converter 620.

Figure 10:
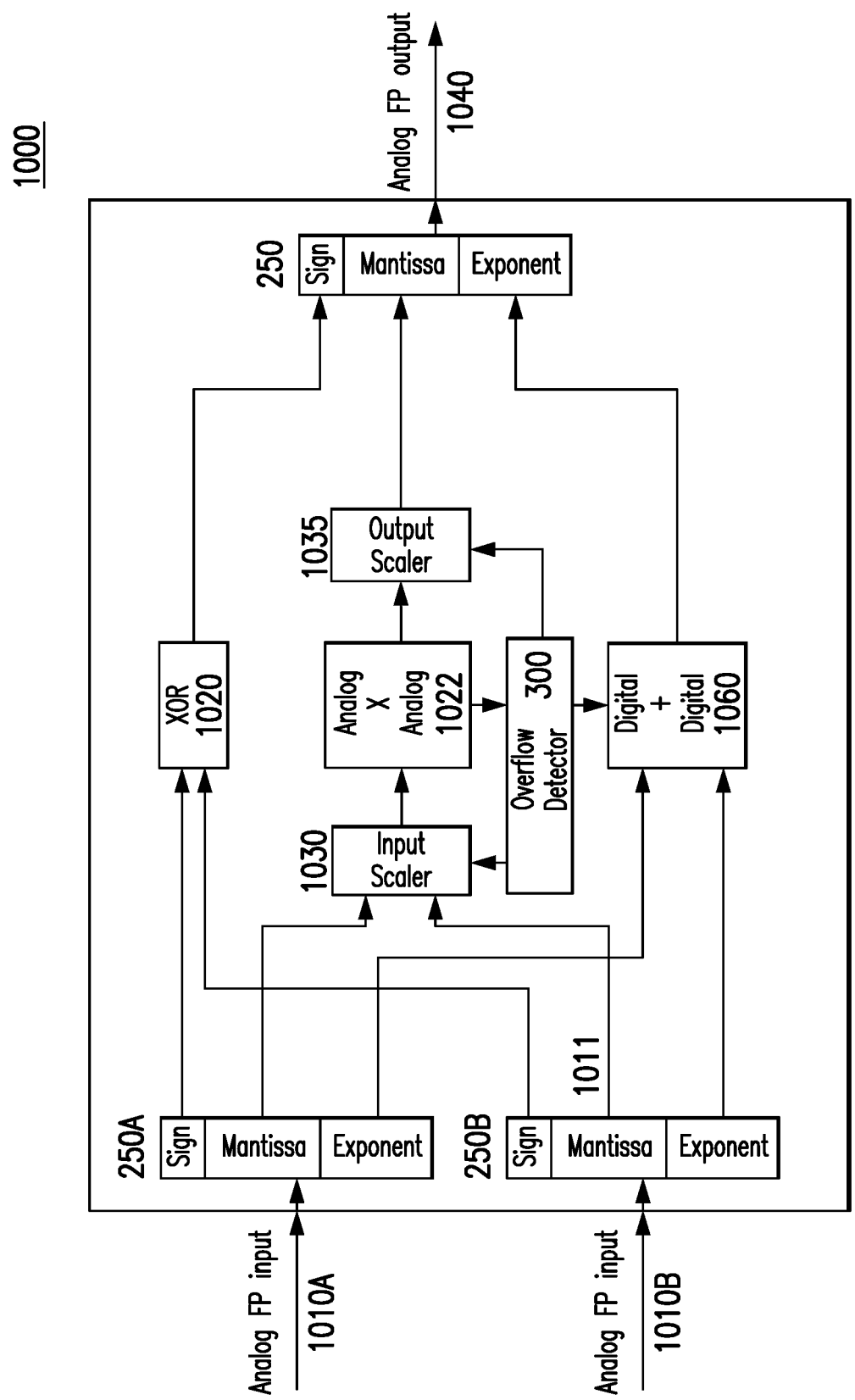
FIG. 10 depicts a floating point analog multiplier according to some embodiments.

FIG. 10 depicts one embodiment of a floating point analog multiplier 1000. In some instances, the floating point analog multiplier 1000 is also referred to as a mixed signal floating point multiplier. As shown in FIG. 10, the analog signals 1010A, 1010B are input in a floating point format 250A, 250B for the floating point analog multiplier 1000. The sign bit of the two signals 1010A-B are transmitted to an XOR 1020. Accordingly, an output of the XOR 1020 based on the two received sign bits forms the sign bit of an analog floating point output 1040. The mantissa of the two signals 1010A-B are passed through an input scaler 1030 before being multiplied together 1022. After an analog by analog multiplication 1022, the result is evaluated by the overflow detector 300. Depending on the amplitude of the result, the result is passed on as the mantissa of the analog floating point output 1040 if the overflow detector 300 does not detect any overflow issues. For example, the required amplitude of the result may be predetermined as between zero volts 211 and V/2 volts 212. In some embodiments, when the amplitude of the result is greater than V/2 volts 212, the overflow detector 300 is configured to instruct an output scaler 1035 to reduce the amplitude of the result by half and increase the exponent of the result by one. In some embodiments, when the amplitude is greater than V volts 213, the overflow detector 300 is configured to instruct the input scaler 1030 to reduce the input voltage of the two inputs 1010A-B by half and each of the input signal exponents is increased by 1. Then the two input signals are multiplied once again. In each embodiment, the exponent resulting from the addition of the two input exponents 1060 forms the exponent of the analog floating point output 1040. In some embodiments, this process involving the overflow detector 300 may continue until the output of the multiplier 1022 falls within the proper limits, e.g. between zero volts 211 and V/2 volts 212. In some embodiments, the input scaler 1030 and the output scaler 1305 may each comprise the scaler 350 as described, for example, in FIG. 3B.

FIGS. 11A-D depict an exemplary embodiment of how a mixed signal computer using the mixed signal arithmetic unit 140 of the present disclosure may be programmed to perform an arithmetic signal processing function. As shown in FIGS. 11A-D, the example is of a four tap Finite Impulse Response (FIR) filter. The FIR filter is used extensively in signal processing applications and may be found as a fundamental building block in engineering and business applications. The FIR filter may also be referred to as a Moving Average function.

Figure 11A:
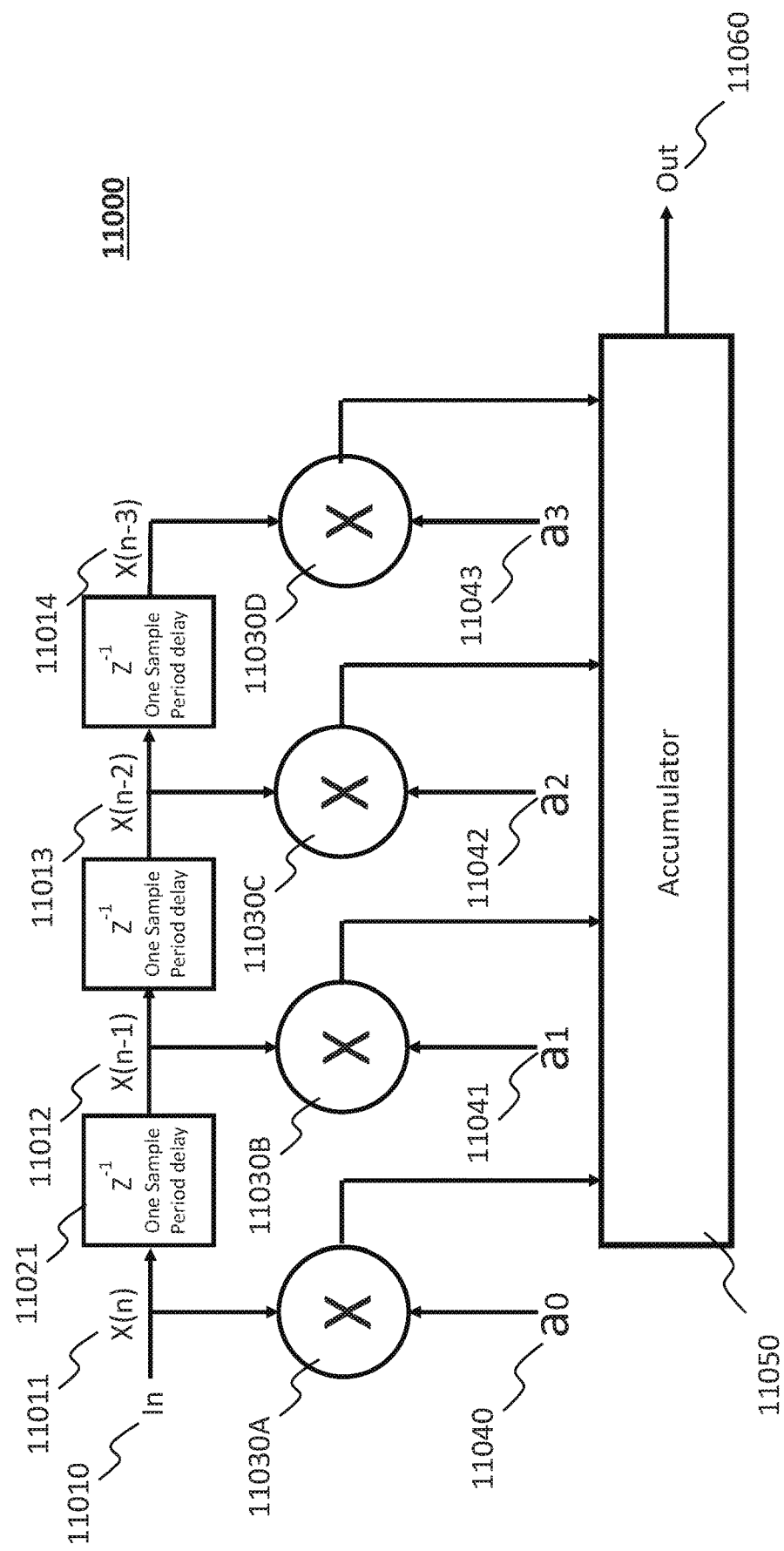

Now referring to FIG. 11A, a block diagram of a simplified digital implementation of a four tap FIR filter 11000 is shown. In some embodiments, the FIR filter 11000 may comprise an input 11010 and an output 11060. The input In 11010 may comprise digital representations of the input signal. A present input sample X(n) 11011 and the three previously input samples X(n−1) 11012, X(n−2) 11013, and X(n−3) 11014 respectively are shown in FIG. 11A. A one sample delay is used to assure that the output sample 11060 is the weighted sum of the present input sample X(n) 11011 and the three previous input samples X(n−1) 11012, X(n−2) 11013, and X(n−3) 11014. During the sample period, the four input samples X(n) 11011, X(n−1) 11012, X(n−2) 11013, X(n−3) 11014 are each multiplied by a coefficient, a0 11040, a1 11041, a2 11042 and a3 11043, respectively. The results of the four multipliers 11030A-D are added together in an accumulator 11050, providing the output 11060 for the present sample period. In some embodiments, this process may be repeated for each sample period with a new X(n) 11011. In such embodiments, the previous X(n) is delayed and becomes X(n−1) 11012, the previous X(n−1) becomes X(n−2) 11013, etc.

Figure 11B:
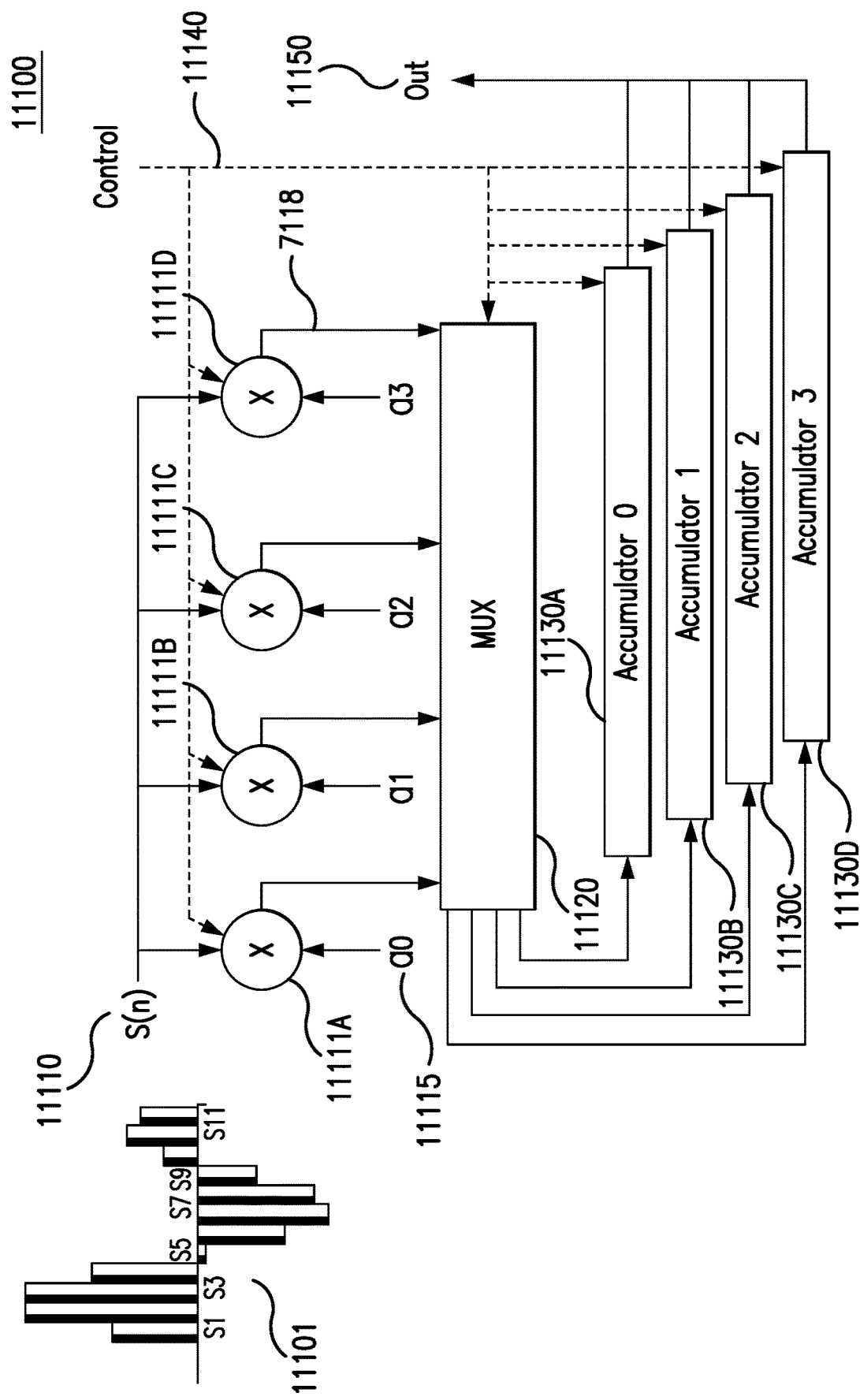

FIG. 11B depicts how the same four tap FIR filter may be implemented in a sampled analog implementation. According to this implementation, the analog FIR filter 11100 may receive analog data points (e.g., S1 through S12 in signal segment 11101) as inputs. As shown in FIG. 11B, the analog FIR filter 11100 may comprise an input 11110 and an output 11150. In some embodiments, the analog FIR filter 11100 comprises a plurality of function elements including, but not limited to, four multipliers 11111A-D, a multiplexer (MUX) 11120, and four accumulators 11130A-D. In some embodiments, the MSAU 140 is configured to control each of the functional elements based on program control input 145 from the program control 130.

FIG. 11C shows a table 11200 depicting the function (i.e., the arithmetic operations) of each functional element of the analog FIR filter 11100 during sample periods P1 through P12, where the sample periods P1-P12 comprise time slices (S1-S12) of the analog signal 11101 being processed. The columns of the table 11200 comprise a list 11221 of the sample periods P1 through P12 in column 11210, a list of the results of the multipliers 11111A-D in column 11224, the results of the multipliers 11111A-D added to each accumulator 11130A-D in columns 11211, the list of which accumulator 11130A-D output is output 11150 from the analog FIR filter 11212 and finally, what result 11223 is output in column 11213 during each sample period P1-P12.

Looking at sample period P1, the output of the four multipliers 11111A-D placed in each of the four accumulators 11130A-D are the results of Sample 1 (S) multiplied by coefficient (a0) 11230, S1 times a1 (shown as S1a1) 11231, S1 times a2 (shown as S1a2) 11232, and S1 times a3 (shown as S1a3) 11233. Each of the results 11230, 11231, 11232, 11233 is added to accumulator 0 through 3, items 11130A-D, respectively. Now looking at only accumulator 0 11130A during a sequence of sample periods P1 through P4 indicated by box 11224, accumulator 0 11130A has the sum of the needed four multiplications to form the correct output 11230 at the end of the P4 sample period, that is S1a0+ S2a1+S3a2+S4a3=out(P4). As further examples, output 11233 for sample period P5 is from accumulator 3 11130D, the output 11232 for sample period P6 is from accumulator 2 11130C, and so forth.

Figure 11D:
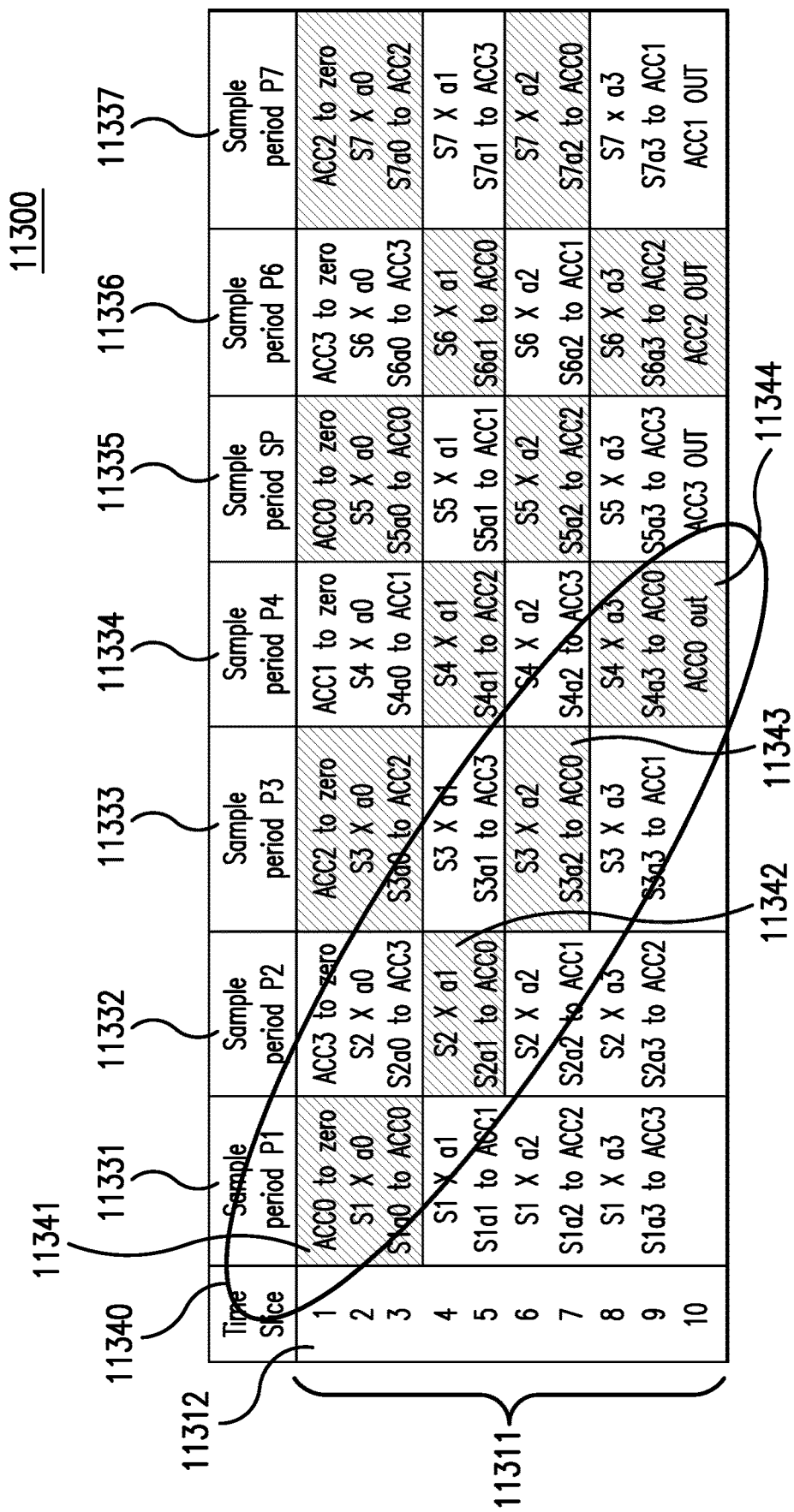

FIG. 11D shows a table 11300 depicting a different arrangement of the same information found in table 11200. That is, table 11300 shows that a sequence of actions occurs during each sample period specific to the time slices in column 11311 of the period. For example during the first time slice 11312 of sample period P1 11331, Accumulator 0 (ACC0) 11130A is set to zero in box 11341, preparing ACC0 for the first multiplication result performed in time slice 2, sample S1 times coefficient a0 (S1a0) 11341, which is added to ACC0 in time slice 3. After these three time slices, the sample S1 is multiplied by the each of the three remaining coefficients (a1, a2, a3) with each added to the appropriate accumulators for the next 6 time slices (4-9) in sample period P1. Now looking at each of the sample periods (Pn) 11331-11337, one of the four accumulators 11130A-D is set to zero in time slice 1 of each sample period. In time slice 2, 4, 6 and 8 of each of the sample periods (Pn) 11331-11337, the sample of that period (Sn), is multiplied by a0, a1, a2, a3 respectively. The results are then added to the appropriate accumulator (ACCn) in time slices 3, 5, 7 and 9. This may continue down the time slices with the sample of each period being multiplied by the coefficients and then added to the appropriate accumulators. Looking now at the time slices encircled by 11340, and specifically at sample period P4 11334, a tenth time slice is added to each of the sample periods. During this $10^h$ time slice, the four samples (S1-S4) which have been multiplied by the four coefficients (a0-a4) with the results added to ACC0 11130A (which has been set to zero in time slice 1 of sample period S1 11341) in time slices 2-9 are output 11344. This process continues during each time slice from sample period four (P4) on. That is, during each of the sample periods (Pn), one of the accumulators 11130A-D is set to zero, the results of four multiplications are added to the appropriate accumulators, and one of the accumulators is outputted.

With respect to the Analog FIR filter 11100 functions, in some instances, the first three sample periods 11222 (e.g., P1, P2, and P3) do not provide an output, as none of the accumulators 11130A-D have the required four results needed for a valid output. Further, at the beginning of each new accumulation within an accumulator 11130A-D, for example in the block of accumulator 0 (as shown in 11224 and 11341) 11130A, the accumulator 0 11130A is set to zero. Each sample period (e.g., P1-P12) may be divided into multiple times slices in such a way that only one multiplier is physically needed to perform all four multiplies during each time slice 11312, as shown in FIG. 11D. In some embodiments, the number of time slices for the analog FIR filter 11100 of length n will be equal to 2n+2.

For simplicity, a four tap FIR filter has been chosen as one example. However, any filter employed in the embodiments disclosed herein are not limited to four taps, but may include as many taps as may be executed using the available time slices during each sample period (Pn). Further, each time slice does not need to be uniform and all of the processes (multiply, add, accumulator management, signal input and output of the filter) may be performed without a slice clock.

Figure 12:
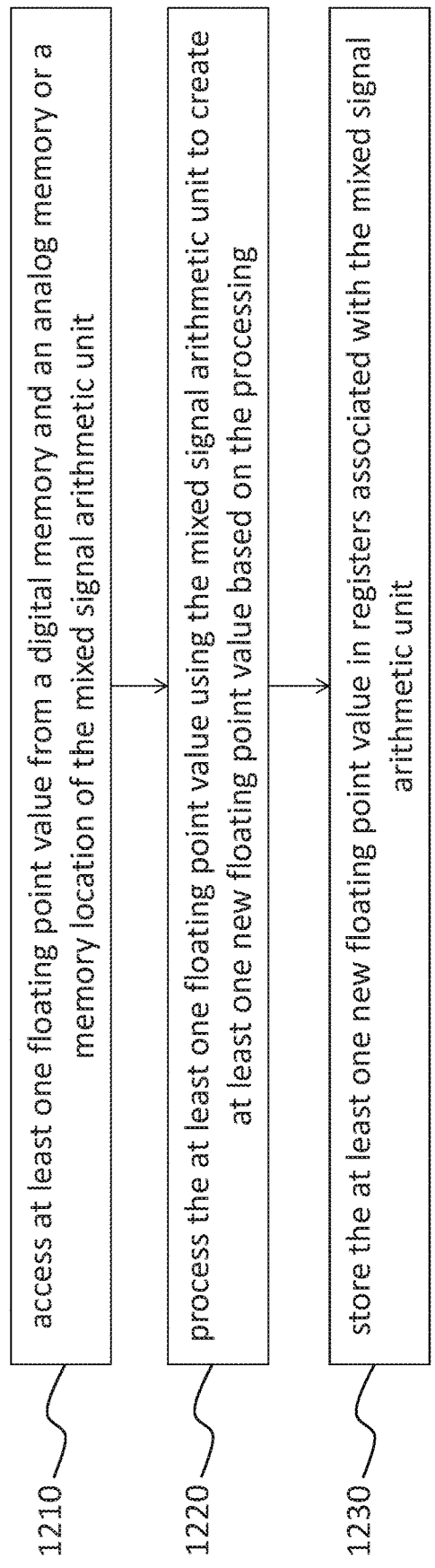
FIG. 12 is a flow chart illustrating a process for performing floating point operations using a mixed signal arithmetic unit according to some embodiments.

FIG. 12 is a flow chart illustrating a process 1200 for performing floating point operations, according to some embodiments. Process 1200 may be performed, for instance, using a mixed signal arithmetic unit 140.

Process 1200 may begin with step 1210 in which at least one floating point value is accessed from a digital memory and an analog memory, or a memory location of the mixed signal arithmetic unit.

In step 1220, the at least one floating point value is processed using the mixed signal arithmetic unit to create at least one new floating point value based on the processing. In some embodiments, the at least one floating point value may be processed as described herein with respected to FIG. 10 and related description.

In step 1230, the at least one new floating point value is stored in registers associated with the mixed signal arithmetic unit. In some embodiments, the new floating point value is stored in the digital memory and the analog memory, or the memory location of the mixed signal arithmetic unit.

Figure 13:
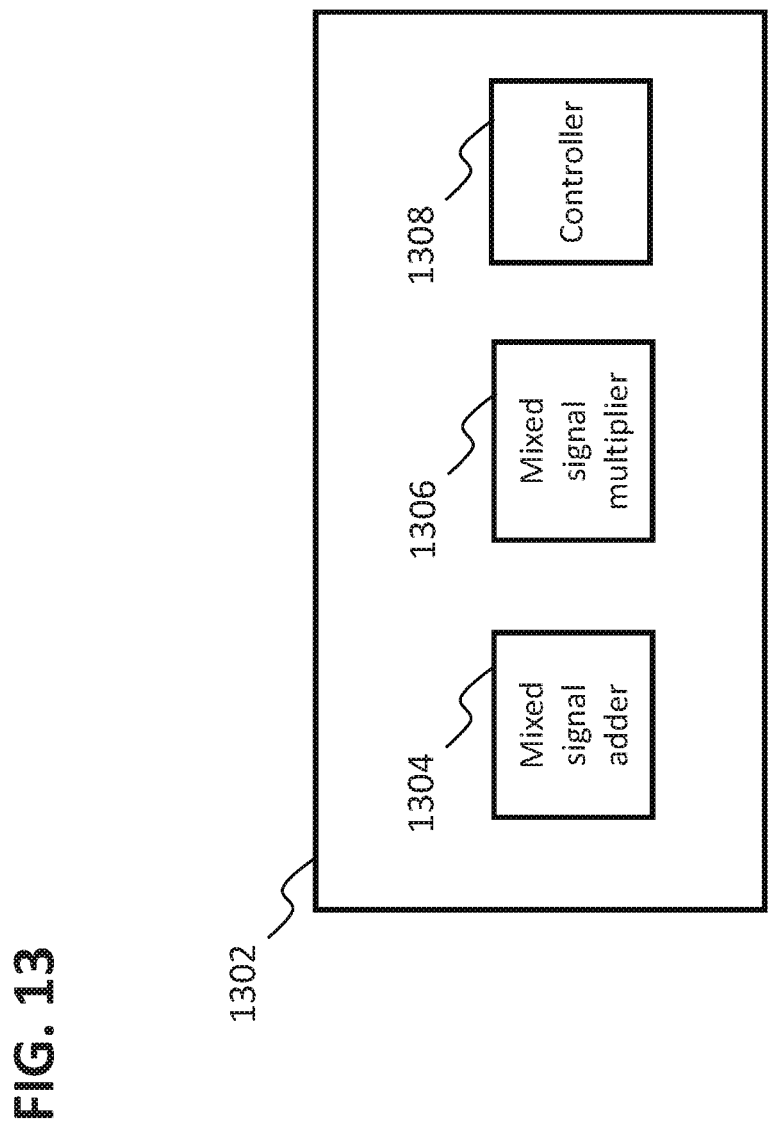
FIG. 13 depicts a block diagram of a mixed signal arithmetic logic unit according to some embodiments.

FIG. 13 depicts a block diagram of a mixed signal arithmetic logic unit according to some embodiments. As shown in FIG. 13, the mixed signal arithmetic logic unit 1302 is provided that comprises a mixed signal adder 1304, a mixed signal multiplier 1306, and a controller 1308. In some embodiments, the controller 1308 is configured to control the mixed signal adder 1304 and the mixed signal multiplier 1306, wherein the controller 1308 is configured to: cause the mixed signal adder 1304 to: (1) add: (i) an analog value with another analog value, (ii) a digital value with an analog value, and (iii) a digital value with another digital value based on a received first and second input value; and (2) send the added value as an analog value or a digital value, wherein the added value is the added value of the received first and second input value, and cause the mixed signal multiplier 1306 to: (1) multiply: (i) an analog value with another analog value, (ii) a digital value with an analog value, and (iii) a digital value with another digital value based on a received third and fourth input value; and (2) send the multiplied value as an analog value or a digital value wherein the multiplied value is the multiplied value of the received third and fourth input value.

According to some embodiments, the mixed signal arithmetic unit 1302 further comprises an input sign management unit configured to receive an analog signal and preprocess the analog signal such that the analog signal is converted into a floating point value. According to some embodiments, the mixed signal arithmetic unit 1302 further comprises an output sign management unit configured to convert the added value or the multiplied value from a floating point value to an analog signal.

According to some embodiments, the mixed signal adder 1304 comprises a first overflow detector configured to determine whether the added value is within a predetermined range. According to some embodiments, the mixed signal adder 1304 further comprises a first input scaler and a first output scaler operatively connected to the first overflow detector and configured to maintain the added value within the predetermined range. In some embodiments, the first overflow detector comprises a first comparator configured to determine whether the added value is lower than a predetermined minimum value, a second comparator configured to determine whether the added value is higher than a predetermined maximum value, and a third comparator configured to determine whether the added value is higher than a predetermined percentage of a predetermined maximum value. In some embodiments, the first output scaler is configured to adjust the resulting added value as a result of the first overflow detector determining that the added value is higher than the predetermined percentage of the predetermined maximum value. In some embodiments, the first input scaler is configured to adjust at least one of the first input value and the second input value as a result of the first overflow detector determining that the added value is higher than the predetermined maximum value.

According to some embodiments, the mixed signal multiplier 1306 comprises a second overflow detector configured to determine whether the multiplied value is within a predetermined range. According to some embodiments, the mixed signal multiplier 1306 further comprises a second input scaler and a second output scaler operatively connected to the second overflow detector and configured to maintain the multiplied value within the predetermined range. In some embodiments, the controller 1308 is further configured to route a mantissa of the third value and a mantissa of the fourth value to the second input scaler, wherein the third value and the fourth value are floating point values. In some embodiments, the second overflow detector comprises a first comparator configured to determine whether the multiplied value is lower than a predetermined minimum value, a second comparator configured to determine whether the multiplied value is higher than a predetermined maximum value, and a third comparator configured to determine whether the multiplied value is higher than a predetermined percentage of the predetermined maximum value. In some embodiments, the second output scaler is configured to adjust the multiplied value as a result of the second overflow detector determining that the multiplied value is higher than the predetermined percentage of the predetermined maximum value. In some embodiments, the second input scaler is configured to adjust at least one of the third input value and the fourth input value as a result of the second overflow detector determining that the multiplied value is higher than the predetermined maximum value. In some embodiments, adjusting the value comprises dividing the input value by two and increasing an exponent of that value by one.

According to some embodiments, the mixed signal multiplier 1306 comprises at least one or more transistors, and wherein each of the at least one or more transistors comprises a different width to length ratio. In some embodiments, each of the at least one or more transistors comprises a transistor gate connected to a bit of the third input value wherein the third input value comprises a digital value, a transistor source connected to the fourth input value, and a transistor drain operatively connected to a summing junction. In some embodiments, the mixed signal multiplier 1306 comprises the summing junction, wherein the summing junction is operatively connected to each of the least one or more transistors and configured to create an output analog value. In some embodiments, the fourth input value comprises an analog value and the output analog value is the multiplied value of the third input value and the fourth input value. In some embodiments, the fourth input value comprises a constant voltage and the output analog signal is a digital-to-analog converted third signal.

According to some embodiments, the mixed signal arithmetic unit 1302 further comprises at least one or more multiplexers, at least one or more analog-to-digital converters (ADCs), and at least one or more digital-to-analog converters (DACs), wherein the controller 1308 is further configured to control the at least one or more multiplexers to route at least one or more of: the received first, second, third, and fourth input value, the added value, and the multiplied value, and wherein the controller 1308 is further configured to control the at least one or more ADCs and DACs to convert at least one or more of: the received first, second, third, and fourth input value, the added value, and the multiplied value.

According to some embodiments, the mixed signal arithmetic unit 1302 further comprises at least one or more digital registers, at least one or more digital memory words, at least one or more analog memory words, and an input configured to receive an analog signal, wherein the controller 1308 is further configured to access the at least one or more digital registers, digital memory words or analog memory words or the input to receive the first, second, third or fourth input value.

According to some embodiments, the mixed signal arithmetic unit 1302 further comprises an output configured to transmit an analog signal, wherein the controller 1308 is further configured to cause the mixed signal adder 1304 or the mixed signal multiplier 1306 to transmit the added value or the multiplied value to the output or the at least one or more digital registers, digital memory words or analog memory words.

In some embodiments, the mixed signal adder 1304 is capable of adding: (i) a first digital value with a second digital value, (ii) a first analog value with a second analog value, and (iii) a third digital value with a third analog value is provided. In some embodiments, the mixed signal adder 1304 is configured to receive: (i) the first digital value and the second digital value, (ii) the first analog value and the second analog value, or (iii) the third digital value and the third analog value; perform an add function to generate an output value, said output value comprising the sum of: (i) the first digital value and the second digital value, (ii) the first digital value and the first analog value, or (iii) the first analog value and the second analog value; and transmit the generated output value, wherein the generated output value may be either an analog output or a digital output.

In some embodiments, the mixed signal multiplier 1306 is provided and capable of multiplying: (i) a first digital value with a second digital value, (ii) a first analog value with a second analog value, and (iii) a third digital value with a third analog value. In some embodiments, the mixed signal multiplier 1306 is configured to receive: (i) the first digital value and the second digital value, (ii) the first analog value and the second analog value, or (iii) the third digital value and the third analog value; multiply to generate an output value, wherein the output value comprises the result of multiplying: (i) the first digital value and the second digital value, (ii) the first analog value and the second analog value, or (iii) the third digital value and the third analog value; and transmit the generated output value, wherein the generated output value is an analog output value or a digital output value.

In some embodiments, the controller 1308 is configured to monitor and control the mixed signal adder 1304 and the mixed signal multiplier 1306 as a function of the types of input signals for said mixed signal arithmetic unit 1302. In some embodiments, the mixed signal adder 1304 may receive the third digital value and the third analog value, wherein the controller 1308 is configured to control one or more exchange registers to convert the third digital value to an analog value or convert the third analog value to a digital value before the mixed signal adder 1304 adds the third digital value and the third analog value. In some embodiments, the mixed signal multiplier 1306 may receive the third digital value and the third analog value, wherein the controller 1308 is configured to control one or more exchange registers to convert the third digital value to an analog value or convert the third analog value to a digital value before the mixed signal multiplier 1306 multiplies the third digital value and the third analog value.

According to some embodiments, the mixed signal arithmetic unit 1302 further comprises at least one or more multiplexers, at least one or more analog-to-digital converters (ADCs), and at least one or more digital-to-analog converters (DACs), wherein the controller 1308 is further configured to control the at least one or more multiplexers to route at least one or more of: the first, second, or third digital value; the first, second, or third analog value; and the generated output value, and wherein the controller is further configured to control the at least one or more ADCs and DACs to convert at least one or more of: the first, second, or third digital value; the first, second, or third analog value; and the generated output value.

According to some embodiments, the mixed signal arithmetic unit 1302 further comprises at least one or more digital registers, at least one or more digital memory words, at least one or more analog memory words, and an input configured to receive an analog signal, wherein the controller 1308 is further configured to access the at least one or more digital registers, digital memory words or analog memory words, or the input to receive the first, second, or third digital value or the first, second, or third analog value. In some embodiments, the mixed signal arithmetic unit 1302 further comprises an output configured to transmit an analog signal, wherein the controller 1308 is further configured to transmit the generated output value to the output or the at least one or more digital registers, digital memory words, or analog memory words.

In some embodiments, the mixed signal adder 1304 is capable of adding two digital values, two analog values, and an analog and a digital value with either an analog or digital result and the mixed signal multiplier 1306 is capable of multiplying two digital values, two analog values, and an analog and a digital value with either an analog or digital result, overflow detector elements for said adder and said multiplier for maintaining output values within defined ranges, scaler elements operatively interconnected with said overflow detector elements for said adder and said multiplier for maintaining output values from said adder and said multiplier within defined ranges. In some embodiments, the mixed signal arithmetic unit 1302 may further comprise a program control unit for monitoring and controlling said mixed signal adder 1304, said mixed signal multiplier 1306, and elements as a function of the types of input signals and desired arithmetic operation to be performed by said mixed signal arithmetic unit 1302.

In some embodiment, the mixed signal adder 1304 comprises one or more digital to analog and analog to digital conversion elements, a digital to digital adder element, an analog to analog adder element, sign management elements for the inputs to said mixed signal adder 1304, sign management elements for the outputs from said mixed signal adder 1304, overflow detector elements for detecting output values outside of defined ranges, scaler elements operatively interconnected with said overflow detector elements for maintaining output values within defined ranges, and a program control unit for monitoring and controlling said elements as a function of the types of input signals for said mixed signal adder 1304.

In some embodiments, the mixed signal multiplier 1306 comprises one or more digital to analog and analog to digital conversion elements, a digital by digital multiplier element, an analog by analog multiplier element, an analog by digital multiplier element, sign management elements for inputs to said mixed signal multiplier 1306, sign management elements for the outputs from said mixed signal multiplier 1306, overflow detector elements for detecting output values outside of defined ranges, scaler elements operatively interconnected with said overflow detector elements for maintaining output values within defined ranges, and a program control unit for monitoring and controlling said elements as a function of the types of input signals for said mixed signal arithmetic unit 1302.

In some embodiments, the mixed signal arithmetic unit 1302 comprises at least one digital signal input and at least one digital signal output; at least one analog signal input and at least one analog signal output, one or more digital to analog conversion elements and one or more analog to digital conversion elements; at least one mixed signal adder 1304 with input and output scalers and a plurality of logic elements capable of being configured as an overflow detector on the output of said adder for maintaining output values in defined ranges and capable of performing arithmetic operations on two or more values, wherein said values may be one or more of: digital values, analog values, a combination of analog and digital; at least one mixed signal multiplier 1306 with input and output scalers and a plurality of logic elements capable of being configured as an overflow detector on the output of said multiplier for maintaining output values in defined ranges and capable of performing arithmetic operations on two or more values, wherein said values may be one or more of: digital values, analog values, and a combination of analog and digital values; and at least one controller 1308 for monitoring and controlling said mixed signal adder, said mixed signal multiplier, said inputs, said outputs, and said conversion elements as a function of the types of input signals, desired output signals and the desired arithmetic operation for said mixed signal arithmetic unit to perform on said input signals.

In some embodiments, said analog values are in a mixed signal floating point format or a floating point format. In some embodiments, said mixed signal floating point format comprises: a sign bit, an analog mantissa value and an exponent value. In some embodiments, said floating point format comprises: an analog mantissa value and an exponent value. In some embodiments, said analog values are in a continuous or a sampled format. In some embodiments, the mixed signal arithmetic unit 1302 further comprises one or more sign management elements under control of said at least one controller 1308.

In some embodiments, said plurality of logic elements comprises: at least one first comparator configured to determine whether an analog input or output value is lower than a predetermined minimum value, at least one second comparator configured to determine whether an analog input or output value is lower than a predetermined maximum value, and at least one third comparator configured to determine whether an analog input or output value is higher than a predetermined percentage of said predetermined maximum value.

In some embodiments, the mixed signal adder 1304 is capable of arithmetic operations on: (i) a plurality of input digital values, (ii) a plurality of input analog values, and (iii) a plurality of input digital values with a plurality of input analog values, the mixed signal adder configured to: receive: (i) said plurality of input digital values, (ii) said plurality of input analog values or (iii) said plurality of input digital values and said plurality of input analog values; perform an arithmetic operation to generate an output value, said output value comprising the result of an arithmetic operation on: (i) said plurality of input digital values, (ii) said plurality of input analog values or (iii) said plurality of input digital values and said plurality of input analog values; and transmit said output value, wherein said output value is an analog output value or a digital output value.

In some embodiments, the mixed signal multiplier 1306 is capable of arithmetic operations on: (i) a plurality of input digital values, (ii) a plurality of input analog values, and (iii) a plurality of input digital values with a plurality of input analog values, the mixed signal multiplier configured to: receive: (i) a plurality of input digital values, (ii) a plurality of input analog values, and (iii) a plurality of input digital values with a plurality of input analog values; perform an arithmetic operation to generate an output value, wherein said output value comprises the result of an arithmetic operation on: (i) a plurality of input digital values, (ii) a plurality of input analog values, or (iii) a plurality of input digital values with a plurality of input analog values; and transmit said output value, wherein said output value is an analog output value or a digital output value.

In some embodiments, the mixed signal arithmetic unit 1302 comprises at least one mixed signal adder 1304 capable of performing arithmetic operations on: (i) a plurality of input digital values, (ii) a plurality of input analog values, and (iii) a plurality of input digital values and a plurality of input analog values, the mixed signal adder configured to perform one or more arithmetic operation to generate an output value, said output value resulting from the completed performance of the one or more arithmetic operation on said input values to said adder; at least one mixed signal multiplier 1306 capable of performing arithmetic operations on: (i) a plurality of input digital values, (ii) a plurality of input analog values, and (iii) a plurality of input digital values and a plurality of input analog values, the mixed signal multiplier configured to perform one or more arithmetic operation to generate an output value, said output value resulting from the completed performance of the one or more arithmetic operation on said input values to said multiplier; at least one mixed signal floating point multiplier capable of performing arithmetic operations on a plurality of input mixed signal floating point analog values, the mixed signal floating point multiplier configured to perform one or more arithmetic operation to generate an output value, said output value resulting from the completed performance of the one or more arithmetic operation on said input mixed signal floating point analog values; and the controller 1308 for monitoring and controlling said at least one mixed signal adder and said at least one mixed signal multiplier as a function of the types of input values and the desired arithmetic operation for said mixed signal arithmetic unit.

According to some embodiments, the mixed signal arithmetic unit 1302 may be configured to operate as a finite impulse response (FIR) filter.

EXEMPLARY EMBODIMENTS

Aspects of the disclosure are summarized by the following numbered embodiments.

Embodiment 1. A mixed signal arithmetic unit, comprising:
a mixed signal adder;
a mixed signal multiplier; and
a controller configured to control the mixed signal adder and the mixed signal multiplier, wherein the controller is configured to:
cause the mixed signal adder to: (1) add: (i) an analog value with another analog value, (ii) a digital value with an analog value, and (iii) a digital value with another digital value based on a received first and second input value and (2) send the added value as an analog value or a digital value, wherein the added value is the added value of the received first and second input value, and
cause the mixed signal multiplier to: (1) multiply: (i) an analog value with another analog value, (ii) a digital value with an analog value, and (iii) a digital value with another digital value based on a received third and fourth input value and (2) send the multiplied value as an analog value or a digital value wherein the multiplied value is the multiplied value of the received third and fourth input value.

Embodiment 2. The mixed signal arithmetic unit of embodiment 1, further comprising:
an input sign management unit configured to receive an analog signal and preprocess the analog signal such that the analog signal is converted into a floating point value.

Embodiment 3. The mixed signal arithmetic unit of embodiment 2,
wherein the floating point value comprises a sign bit, a mantissa, and an exponent, and
wherein the sign bit is stored as a digital value, the mantissa is stored as an analog absolute value, and the exponent is stored as a digital value.

Embodiment 4. The mixed signal arithmetic unit of any one of embodiments 1-3, further comprising:
an output sign management unit configured to convert the added value or the multiplied value from a floating point value to an analog signal.

Embodiment 5. The mixed signal arithmetic unit of any one of embodiments 1-4, wherein the mixed signal adder comprises:
a first overflow detector configured to determine whether the added value is within a predetermined range.

Embodiment 6. The mixed signal arithmetic unit of embodiment 5, wherein the mixed signal adder comprises:
a first input scaler and a first output scaler operatively connected to the first overflow detector and configured to maintain the added value within the predetermined range.

Embodiment 7. The mixed signal arithmetic unit of embodiment 5 or 6, the first overflow detector comprising:
a first comparator configured to determine whether the added value is lower than a predetermined minimum value;
a second comparator configured to determine whether added value is higher than a predetermined maximum value; and
a third comparator configured to determine whether the added value is higher than a predetermined percentage of the predetermined maximum value.

Embodiment 8. The mixed signal arithmetic unit of embodiment 7,
wherein the first output scaler is configured to adjust the added value as a result of the first overflow detector determining that the added value is higher than the predetermined percentage of the predetermined maximum value.

Embodiment 9. The mixed signal arithmetic unit of embodiment 7 or 8,
wherein the first input scaler is configured to adjust at least one of the first input value and the second input value as a result of the first overflow detector determining that the added value is higher than the predetermined maximum value.

Embodiment 10. The mixed signal arithmetic unit of any one of embodiments 1-9, the mixed signal multiplier comprising:

a second overflow detector configured to determine whether the multiplied value is within the predetermined range.

Embodiment 11. The mixed signal arithmetic unit of embodiment 10, the mixed signal multiplier comprising:

a second input scaler and a second output scaler operatively connected to the second overflow detector and configured to maintain the multiplied value within the predetermined range.

Embodiment 12. The mixed signal arithmetic unit of embodiment 11, wherein the third value and the fourth value are floating point values, and wherein the controller is further configured to route a mantissa of the third value and a mantissa of the fourth value to the second input scaler.

Embodiment 13. The mixed signal arithmetic unit of embodiment 10 or 11, the second overflow detector comprising:

a first comparator configured to determine whether the multiplied value is lower than a predetermined minimum value;

a second comparator configured to determine whether the multiplied value is higher than a predetermined maximum value; and a third comparator configured to determine whether the multiplied value is higher than the predetermined percentage of the predetermined maximum value.

Embodiment 14. The mixed signal arithmetic unit of embodiment 13, wherein the second output scaler is configured to adjust the multiplied value as a result of the second overflow detector determining that the multiplied value is higher than the predetermined percentage of the predetermined maximum value.

Embodiment 15. The mixed signal arithmetic unit of embodiment 13 or 14, wherein the second input scaler is configured to adjust at least one of the third input value and the fourth input value as a result of the second overflow detector determining that the multiplied value is higher than the predetermined maximum value.

Embodiment 16. The mixed signal arithmetic unit of any one of embodiments 8, 9, 14, and 15, wherein adjusting the value comprises dividing the value by two and increasing an exponent of the value by one.

Embodiment 17. The mixed signal arithmetic unit of any one of embodiments 1-16, wherein the mixed signal multiplier comprises at least one or more transistors, and wherein each of the at least one or more transistors comprises a different width to length ratio.

Embodiment 18. The mixed signal arithmetic unit of embodiment 17, wherein each of the at least one or more transistors comprises:

a transistor gate connected to a bit of the third input value wherein the third input value comprises a digital value;

a transistor source connected to the fourth input value; and a transistor drain operatively connected to a summing junction.

Embodiment 19. The mixed signal arithmetic unit of embodiment 18, wherein the mixed signal multiplier comprises the summing junction, and wherein the summing junction is operatively connected to each of the least one or more transistors and configured to create an output analog value.

Embodiment 20. The mixed signal arithmetic unit of embodiment 19, wherein the fourth input value comprises an analog value, and wherein the output analog value is the multiplied value of the third input value and the fourth input value.

Embodiment 21. The mixed signal arithmetic unit of embodiment 19, wherein the fourth input value comprises a constant voltage, and wherein the output analog signal is a digital-to-analog converted third signal.

Embodiment 22. The mixed signal arithmetic unit of any one of embodiments 1-21, further comprising:

at least one or more multiplexers;

at least one or more analog-to-digital converters (ADCs); and at least one or more digital-to-analog converters (DACs), wherein the controller is further configured to control the at least one or more multiplexers to route at least one or more of: the received first, second, third, and fourth input value, the added value, and the multiplied value, and wherein the controller is further configured to control the at least one or more ADCs and DACs to convert at least one or more of: the received first, second, third, and fourth input value, the added value, and the multiplied value.

Embodiment 23. The mixed signal arithmetic unit of any one of embodiments 1-22, further comprising:

at least one or more digital registers;

at least one or more digital memory words;

at least one or more analog memory words; and an input configured to receive an analog signal, wherein the controller is further configured to access the at least one or more digital registers, digital memory words or analog memory words or the input to receive the first, second, third or fourth input value.

Embodiment 24. The mixed signal arithmetic unit of embodiment 23, further comprising:

an output configured to transmit an analog signal, wherein the controller is further configured to cause the mixed signal adder or the mixed signal multiplier to transmit the added value or the multiplied value to the output or the at least one or more digital registers, digital memory words or analog memory words.

Embodiment 25. The mixed signal arithmetic unit of any one of embodiments 1-24, wherein the mixed signal arithmetic unit is configured to operate as a finite impulse response (FIR) filter.

Embodiment 26. A mixed signal adder capable of adding: (i) a first digital value with a second digital value, (ii) a first analog value with a second analog value, and (iii) a third digital value with a third analog value, the mixed signal adder configured to:

receive: (i) the first digital value and the second digital value, (ii) the first analog value and the second analog value or (iii) the third digital value and the third analog value;

perform an addition operation to generate an output value, said output value comprising the sum of: (i) the first digital value and the second digital value, (ii) the first digital value and the first analog value or (iii) the first analog value and the second analog value; and transmit the generated output value, wherein the generated output value is an analog output value or a digital output value.

Embodiment 27. A mixed signal multiplier capable of multiplying: (i) a first digital value with a second digital value, (ii) a first analog value with a second analog value, and (iii) a third digital value with a third analog value, the mixed signal multiplier configured to:

receive: (i) the first digital value and the second digital value, (ii) the first analog value and the second analog value or (iii) the third digital value and the third analog value;

perform a multiplication operation to generate an output value, wherein the output value comprises the result of multiplying: (i) the first digital value and the second digital value, (ii) the first analog value and the second analog value or (iii) the third digital value and the third analog value; and transmit the generated output value, wherein the generated output value is an analog output value or a digital output value.

Embodiment 28. A mixed signal arithmetic unit, comprising:
a mixed signal adder of embodiment 26; and
a mixed signal multiplier of embodiment 27.

Embodiment 29. The mixed signal arithmetic unit of embodiment 28, further comprising a controller configured to monitor and control the mixed signal adder and the mixed signal multiplier as a function of the types of input signals for said mixed signal arithmetic unit.

Embodiment 30. The mixed signal arithmetic unit of embodiment 29,
wherein the mixed signal adder receives the third digital value and the third analog value, and
wherein the controller is configured to control one or more exchange registers to convert the third digital value to an analog value or convert the third analog value to a digital value before the mixed signal adder adds the third digital value and the third analog value.

Embodiment 31. The mixed signal arithmetic unit of embodiment 29,
wherein the mixed signal multiplier receives the third digital value and the third analog value, and
wherein the controller is configured to control one or more exchange registers to convert the third digital value to an analog value or convert the third analog value to a digital value before the mixed signal multiplier multiplies the third digital value and the third analog value.

Embodiment 32. The mixed signal arithmetic unit of any one of embodiments 29-31, further comprising:
at least one or more multiplexers:
at least one or more analog-to-digital converters (ADCs); and
at least one or more digital-to-analog converters (DACs),
wherein the controller is further configured to control the at least one or more multiplexers to route at least one or more of: the first, second or third digital input value, the first, second or third analog input value, and the generated output value, and
wherein the controller is further configured to control the at least one or more ADCs and DACs to convert at least one or more of: the first, second or third digital input value, the first, second or third analog input value, and the generated output value.

Embodiment 33. The mixed signal arithmetic unit of any one of embodiments 29-32, further comprising:
at least one or more digital registers;
at least one or more digital memory words;
at least one or more analog memory words; and
an input configured to receive an analog signal,
wherein the controller is further configured to access the at least one or more digital registers, digital memory words or analog memory words or the input to receive the first, second or third digital input value or the first, second or third analog input value.

Embodiment 34. The mixed signal arithmetic unit of embodiment 33, further comprising:
an output configured to transmit an analog signal,
wherein the controller is further configured to transmit the generated output value to the output or the at least one or more digital registers, digital memory words or analog memory words.

Embodiment 35. The mixed signal arithmetic unit of any of embodiments 28-34, wherein the mixed signal arithmetic unit is configured to operate as a finite impulse response (FIR) filter.

Embodiment 36. A method for performing floating point operations using a mixed signal arithmetic unit, comprising:
accessing at least one floating point value from a digital memory word and an analog memory word or a memory location of the mixed signal arithmetic unit;
processing the floating point value using the mixed signal arithmetic unit to create at least one new floating point value based on the processing; and
storing the at least one new floating point value in registers associated with the mixed signal arithmetic unit.

Embodiment 37. A mixed signal arithmetic unit, comprising:
a mixed signal adder component capable of adding two digital values, two analog values, and an analog and a digital value with either an analog or digital result;
a mixed signal multiplier component capable of multiplying two digital values, two analog values, and an analog and a digital value with either an analog or digital result;
overflow detector elements for said adder and said multiplier for maintaining output values in defined ranges;
scaler elements operatively interconnected with said overflow detector elements for said adder and said multiplier for maintaining output values from said adder and said multiplier in defined ranges; and
a program control unit for monitoring and controlling said mixed signal adder, said mixed signal multiplier, and elements as a function of the types of input signals and desired operation for said mixed signal arithmetic unit.

Embodiment 38. A mixed signal adder, comprising:
one or more digital to analog and analog to digital conversion elements;
a digital to digital adder element;
an analog to analog adder element;
sign management elements for the inputs to said mixed signal adder:
sign management elements for the outputs from said mixed signal adder;
overflow detector elements for maintaining output values in defined ranges;
scaler elements operatively interconnected with said overflow detector elements for maintaining output values in defined ranges; and
a program control unit for monitoring and controlling said elements as a function of the types of input signals for said mixed signal adder.

Embodiment 39. A mixed signal multiplier, comprising:
one or more digital to analog and analog to digital conversion elements,
a digital by digital multiplier element,
an analog by analog multiplier element,
an analog by digital multiplier element,
sign management elements for inputs to said mixed signal multiplier,
sign management elements for the outputs from said mixed signal multiplier, overflow detector elements for maintaining output values in defined ranges, scaler elements operatively interconnected with said overflow detector elements for maintaining output values in defined ranges, and a program control unit for monitoring and controlling said elements as a function of the types of input signals for said mixed signal arithmetic unit.

Embodiment 40. A mixed signal arithmetic unit, comprising:

at least one digital signal input,
at least one digital signal output,
at least one analog signal input,
at least one analog signal output,
one or more digital to analog and analog to digital conversion elements,
a mixed signal adder with input and output scalers and an overflow detector on the output of said adder for maintaining output values within defined ranges and capable of adding together two or more values, wherein said values are: two or more digital values, two or more analog values, and one or more analog values and one or more digital values,
a mixed signal multiplier with input and output scalers and an overflow detector on the output of said multiplier for maintaining output values within defined ranges and capable of multiplying together two or more values, wherein said values are: two or more digital values, two or more analog values, two or more analog values in floating point format, and one or more analog values and one or more digital values, and
a program control unit for monitoring and controlling said mixed signal adder, said mix signal multiplier and elements as a function of the types of input signals for said mixed signal arithmetic unit.

Embodiment 41. A mixed signal arithmetic unit, comprising:

a mixed signal adder;
a mixed signal multiplier; and
a controller configured to separately control the mixed signal adder and separately control the mixed signal multiplier, wherein the controller is configured to:
cause the mixed signal adder to: (1) add a received first and second input value, wherein said first and second input values may be: (i) an analog value and another analog value, (ii) a digital value and an analog value, and (iii) a digital value and another digital value and (2) provide as an output the added value as an analog value or a digital value, and
cause the mixed signal multiplier to: (1) multiply a received third and fourth input value, wherein said third and fourth input values may be: (i) an analog value and another analog value, (ii) a digital value and an analog value, and (iii) a digital value and another digital value and (2) provide as an output the multiplied value as an analog value or a digital value.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A mixed signal arithmetic unit, the unit comprising:
at least one digital signal input and at least one digital signal output;
at least one analog signal input and at least one analog signal output;
one or more digital to analog conversion elements;
one or more analog to digital conversion elements;
at least one mixed signal adder comprising one or more input scalers, one or more output scalers, and a first plurality of logic elements, (i) wherein the first plurality of logic elements is configured as a first overflow detector for an output of said at least one mixed signal adder, (ii) further wherein the first overflow detector is configured to maintain output values of the output of said at least one mixed signal adder to be within one or more ranges, and (iii) further wherein said at least one mixed signal adder is configured to perform one or more arithmetic operations on two or more input values which are any one or more of: first digital values received on said digital signal input or from said one or more analog to digital conversion elements, first analog values received on said at least one analog signal input or from said one or more digital to analog conversion elements, and a first combination of said first analog values and said first digital values;
at least one mixed signal multiplier comprising one or more input scalers, one or more output scalers, and a second plurality of logic elements, (i) wherein the second plurality of logic elements is configured as a second overflow detector for an output of said at least one mixed signal multiplier, (ii) further wherein the second overflow detector is configured to maintain output values of the output of said at least one mixed signal multiplier to be within one or more ranges, and (iii) further wherein said at least one mixed signal multiplier is configured to perform arithmetic operations on two or more input values which are any one or more of: second digital values received on said digital signal input or from said one or more analog to digital conversion elements, second analog values received on said at least one analog signal input or from said one or more digital to analog conversion elements, and a second combination of said second analog values and said second digital values; and
at least one controller for one or more of monitoring and/or controlling said at least one mixed signal adder, said at least one mixed signal multiplier, said at least one digital input, said at least one analog input, said at least one digital output, said at least one analog output, said one or more digital to analog conversion elements, and said one or more analog to digital conversion elements, wherein the controlling is performed as a function of a type of input signal received on the digital signal input or analog signal input, a type of desired output signal on the digital signal output or analog signal output, and a desired arithmetic operation for said mixed signal arithmetic unit.

2. The mixed signal arithmetic unit of claim 1, wherein said first analog values and/or said second analog values are in a mixed signal floating point format or a floating point format.

3. The mixed signal arithmetic unit of claim 2, wherein said mixed signal floating point format comprises: a sign bit, an analog mantissa value, and an exponent value.

4. The mixed signal arithmetic unit of claim 2, wherein said floating point format comprises: an analog mantissa value and an exponent value.

5. The mixed signal arithmetic unit of claim 1, wherein said first analog values and/or said second analog values are in a continuous or a sampled format.

6. The mixed signal arithmetic unit of claim 1, further comprising:
one or more sign management elements, wherein said one or more sign management elements are configured to be controlled by said at least one controller.

7. The mixed signal arithmetic unit of claim 1, wherein each of said first and second plurality of logic elements comprises
a first comparator, a second comparator, and a third comparator.

8. The mixed signal arithmetic unit of claim 7, wherein:
the first comparator is configured to determine whether a value from the output of said at least one mixed signal adder or at least on mixed signal multiplier is lower than a predetermined minimum value,
the second comparator is configured to determine whether the value from the output of said at least one mixed signal adder or at least on mixed signal multiplier is lower than a predetermined maximum value, and
the third comparator is configured to determine whether the value from the output of said at least one mixed signal adder or at least on mixed signal multiplier is higher than a predetermined percentage of said predetermined maximum value.

9. The mixed signal arithmetic unit of claim 8, wherein the value from the output of said at least one mixed signal adder or at least on mixed signal multiplier is an analog value.

10. The mixed signal arithmetic unit of claim 1, wherein said at least one mixed signal adder is configured to:
perform an arithmetic operation to generate an output value, said output value comprising the result of an arithmetic operation on: (i) at least one of said first digital values, (ii) at least one of said first analog values, or (iii) a combination of at least one of said first analog values and said first digital values; and
transmit said output value, wherein said output value is an analog output value or a digital output value.

11. The mixed signal arithmetic unit of claim 1, wherein said at least one mixed signal multiplier is configured to:
perform an arithmetic operation to generate an output value, wherein said output value comprises the result of an arithmetic operation on: (i) at least one of said second digital values, (ii) at least one of said second analog values, or (iii) a combination of at least one of said second digital values and said second analog values; and
transmit said output value, wherein said output value is an analog output value or a digital output value.

12. The mixed signal arithmetic unit of claim 1, further comprising:
at least one mixed signal floating point multiplier configured to perform arithmetic operations on a plurality of input mixed signal floating point analog values, the at least one mixed signal floating point multiplier configured to perform one or more arithmetic operations to generate an output value, said output value resulting from the completed performance of the one or more arithmetic operations on said input mixed signal floating point analog values,
wherein said controller for monitoring and controlling said at least one mixed signal adder and said at least one mixed signal multiplier is configured to further monitor and control said at least one mixed floating point multiplier as a function of the types of input values and the desired arithmetic operation for said mixed signal arithmetic unit.

13. The mixed signal arithmetic unit of claim 1, wherein said at least one mixed signal multiplier comprises one or more transistors, and wherein each of said one or more transistors comprises a different width to length ratio.

14. The mixed signal arithmetic unit of claim 13, wherein each of said one or more transistors comprises:
a transistor gate connected to a bit of an input value which comprises a digital value;
a transistor source connected to another input value; and
a transistor drain operatively connected to a summing junction.

15. The mixed signal arithmetic unit of claim 14, wherein said at least one mixed signal multiplier comprises the summing junction, and wherein the summing junction is operatively connected to each of said one or more transistors and configured to create an output analog value.

16. The mixed signal arithmetic unit of claim 1, wherein
said at least one analog signal output is configured to transmit an analog signal, and wherein
the controller is further configured to cause said at least one mixed signal adder or said at least one mixed signal multiplier to transmit final results of arithmetic operations to said output or to at least one or more of digital registers, digital memory words, or analog memory words.

17. The mixed signal arithmetic unit of claim 1, wherein the controller is configured to control one or more exchange registers to convert a digital value to an analog value or convert an analog value to a digital value before said at least one mixed signal multiplier or said at least one mixed signal adder performs arithmetic operations.

18. A mixed signal filter, the mixed signal filter comprising:
one or more mixed signal multipliers, wherein each of the said one or more mixed signal multipliers has inputs of i) at least one or more digital coefficient values and ii) an analog signal;
one or more multiplexers operatively connected to said one or more mixed signal multipliers and configured to (i) be sequenced by a first control signal to receive each output of each of said one or more mixed signal multipliers during each of a plurality of sample periods and (ii) distribute the output of each of said one or more mixed signal multipliers;
one or more accumulators operatively connected to said one or more multiplexers to accumulate the output of each of said one or more mixed signal multipliers and configured to output a sampled analog result in a predetermined sequence in responsive to a second control signal; and
a control logic for providing said first control signal to said one or more multiplexers and said second control signal to said one or more accumulators.

* * * * *